(12) United States Patent
Lin et al.

(10) Patent No.: US 12,272,496 B2
(45) Date of Patent: Apr. 8, 2025

(54) CAPACITORS, ELECTRODES, REDUCED GRAPHENE OXIDE AND METHODS AND APPARATUSES OF MANUFACTURE

(71) Applicant: Royal Melbourne Institute of Technology, Melbourne (AU)

(72) Inventors: Han Lin, Melbourne (AU); Baohua Jia, Melbourne (AU)

(73) Assignee: Royal Melbourne Institute of Technology, Melbourne (AU)

(*) Notice: Subject to any disclaimer, the term of this patent is extended or adjusted under 35 U.S.C. 154(b) by 0 days.

(21) Appl. No.: 17/959,625

(22) Filed: Oct. 4, 2022

(65) Prior Publication Data
US 2023/0118294 A1 Apr. 20, 2023

Related U.S. Application Data

(63) Continuation of application No. 16/328,570, filed as application No. PCT/AU2017/050916 on Aug. 29, 2017, now abandoned.

(30) Foreign Application Priority Data

Aug. 30, 2016 (AU) ................................ 2016903449

(51) Int. Cl.
*C01B 32/198* (2017.01)
*B05D 3/06* (2006.01)
(Continued)

(52) U.S. Cl.
CPC ............... *H01G 11/86* (2013.01); *B05D 3/06* (2013.01); *C01B 32/192* (2017.08);
(Continued)

(58) Field of Classification Search
CPC . C01B 32/192; C01B 32/198; C01B 2204/22; B05D 3/06; H01G 11/86; H01G 11/24; H01G 11/28; H01G 11/32
See application file for complete search history.

(56) References Cited

U.S. PATENT DOCUMENTS

| | | |
|---|---|---|
| 9,099,376 B1 | 8/2015 | Yung et al. |
| 2014/0050910 A1 | 2/2014 | Mukherjee et al. |

(Continued)

FOREIGN PATENT DOCUMENTS

| | | |
|---|---|---|
| CN | 108622880 A | 10/2018 |
| EP | 3 016 178 A1 | 5/2016 |

(Continued)

OTHER PUBLICATIONS

Deng, Hui, et al. "Reverse osmosis desalination of chitosan cross-linked graphene oxide/titania hybrid lamellar membranes." Nanotechnology 27.27 (2016): 274002.*

(Continued)

*Primary Examiner* — Richard M Rump
(74) *Attorney, Agent, or Firm* — Wolf, Greenfield & Sacks, P.C.

(57) ABSTRACT

A method, including irradiating graphene oxide (GO) with a beam of light or radiation to form reduced graphene oxide (RGO) in a three-dimensional (3D) pattern, wherein the RGO is porous RGO with pores having sizes tuned by controlling the beam of light or radiation.

18 Claims, 21 Drawing Sheets

(51) Int. Cl.
- *C01B 32/192* (2017.01)
- *H01G 11/24* (2013.01)
- *H01G 11/28* (2013.01)
- *H01G 11/32* (2013.01)
- *H01G 11/86* (2013.01)

(52) U.S. Cl.
CPC .......... *C01B 32/198* (2017.08); *H01G 11/24* (2013.01); *H01G 11/28* (2013.01); *H01G 11/32* (2013.01); *C01B 2204/22* (2013.01)

(56) References Cited

U.S. PATENT DOCUMENTS

| | | | |
|---|---|---|---|
| 2015/0218003 | A1 | 8/2015 | Zhamu et al. |
| 2015/0259212 | A1 | 9/2015 | Li et al. |
| 2015/0284253 | A1 | 10/2015 | Zhamu et al. |
| 2016/0064726 | A1 | 3/2016 | Ikenuma et al. |
| 2016/0228846 | A1 | 8/2016 | Chen et al. |
| 2016/0304351 | A1 | 10/2016 | Zhamu et al. |
| 2017/0178824 | A1 | 6/2017 | Kaner et al. |
| 2019/0224628 | A1 | 7/2019 | Lin et al. |
| 2019/0284403 | A1 | 9/2019 | Kaner et al. |
| 2021/0065996 | A1 | 3/2021 | Lin et al. |
| 2022/0144645 | A1 | 5/2022 | Jia et al. |

FOREIGN PATENT DOCUMENTS

| | | |
|---|---|---|
| KR | 2013-0044778 A | 5/2013 |
| KR | 2018-0057360 A1 | 5/2018 |
| KR | 102365020 B1 | 2/2022 |
| WO | WO 2018/039710 A1 | 3/2018 |

OTHER PUBLICATIONS

Kotov, Nicholas A., Imre Dékány, and Janos H. Fendler. "Ultrathin graphite oxide-polyelectrolyte composites prepared by self-assembly: Transition between conductive and non-conductive states." Advanced Materials 8.8 (1996): 637-641.*

Chang, Guanru, et al. "Reduced graphene oxide/amaranth extract/AuNPs composite hydrogel on tumor cells as integrated platform for localized and multiple synergistic therapy." ACS Applied Materials & Interfaces 7.21 (2015): 11246-11256.*

Chang, Han-Wei, et al. "Reduction of graphene oxide in aqueous solution by femtosecond laser and its effect on electroanalysis." Electrochemistry Communications 23 (2012): 37-40.*

Ibrahim, Khaled H., et al. "A Novel Femtosecond Laser-Assisted Method for the Synthesis of Reduced Graphene Oxide Gels and Thin Films with Tunable Properties." Advanced Materials Interfaces 3.14 (2016): 1500864.*

International Search Report and Written Opinion mailed Nov. 9, 2017 in connection with International Application No. PCT/AU2017/050916.

International Preliminary Report on Patentability mailed Mar. 5, 2019 in connection with International Application No. PCT/AU2017/050916.

Supplementary European Search Report dated Apr. 3, 2020 in connection with European Application No. 17844672.0.

Australian Examination Report dated Jul. 13, 2021 in connection with Australian Application No. 2017320331.

International Search Report and Written Opinion mailed May 12, 2020 in connection with International Application No. PCT/AU2020/050160.

International Preliminary Report on Patentability mailed Sep. 2, 2021 in connection with International Application No. PCT/AU2020/050160.

Chua et al., Chemical reduction of graphene oxide: a synthetic chemistry viewpoint. Chem Soc Rev. Jan. 7, 2014;43(1):291-312. doi: 10.1039/c3cs60303b. Epub Oct. 11, 2013. PMID: 24121318.

Dikin et al., Preparation and characterization of graphene oxide paper. Nature. Jul. 26, 2007; 448:457-460.

El-Kady et al., Laser scribing of high-performance and flexible graphene-based electrochemical capacitors. Science. Mar. 16, 2012; 335:1326-1330.

Guo et al., Cyclodextrin functionalized graphene nanosheets with high supramolecular recognition capability: synthesis and host-guest inclusion for enhanced electrochemical performance. ACS NANO. Jul. 27, 2010; 4(7):4001-10.

Hummers et al., Preparation of Graphitic Oxide. Journal of the American Chemical Society. 1958; 80(6):1339.

Jo et al., Ultrathin Supercapacitor Electrode Based on Reduced Graphene Oxide Nanosheets Assembled with Photo-Cross-Linkable Polymer: Conversion of Electrochemical Kinetics in Ultrathin Films. Chemistry of Materials 27.23 (2015): 7982-7989. 8 pages.

Liu et al., Laser irradiated self-supporting and flexible 3-dimensional graphene-based film electrode with promising electrochemical properties. RSC Adv. (Royal society of Chemistry Advances). May 12, 2015; 5:47074-47079.

Ma et al., Nickel Cobalt Hydroxide @Reduced Graphene Oxide Hybrid Manolayers for High Performance Asymmetric Supercapacitors with Remarkable Cycling Stability. ACS applied materials & interfaces, 8.3 (2016): 1992-2000. 9 pages. Downloaded Mar. 23, 23022.

Marcano et al., Improved Synthesis of Graphene Oxide. ACS NANO. 2010; 4(8):4806-4814.

Moon et al., 2D Graphene Oxide Nanosheets as an Adhesive Over-Coating Layer for Flexible Transparent Conductive Electrodes. Scientific Reports. Jan. 23, 2013; 3:1112, 7 pages.

Samavati et al., Fractal capacitors. IEEE Journal of solid-state circuits. Dec. 1998; 33(12):2035-2041.

Teoh et al., Direct laser-enabled graphene oxide—Reduced graphene oxide layered structures with micropatterning. J. Appl. Phys. 2012;112:064309-1-064309-6.

Voiry et al., High-quality graphene via microwave reduction of solution-exfoliated graphene oxide. Science. Sep. 23, 2016;353(6306):1413-1416. doi: 10.1126/science.aah3398. Epub Sep. 1, 2016. PMID: 27708034.

Zhou et al., Microstructuring of Graphene Oxide Nanosheets Using Direct Laser Writing. Advanced Materials 21.1 (2009): 67-71. 5 pages.

Office Action for U.S. Appl. No. 17/433,438 dated Aug. 29, 2023 and claims pending as of Aug. 29, 2023.

* cited by examiner

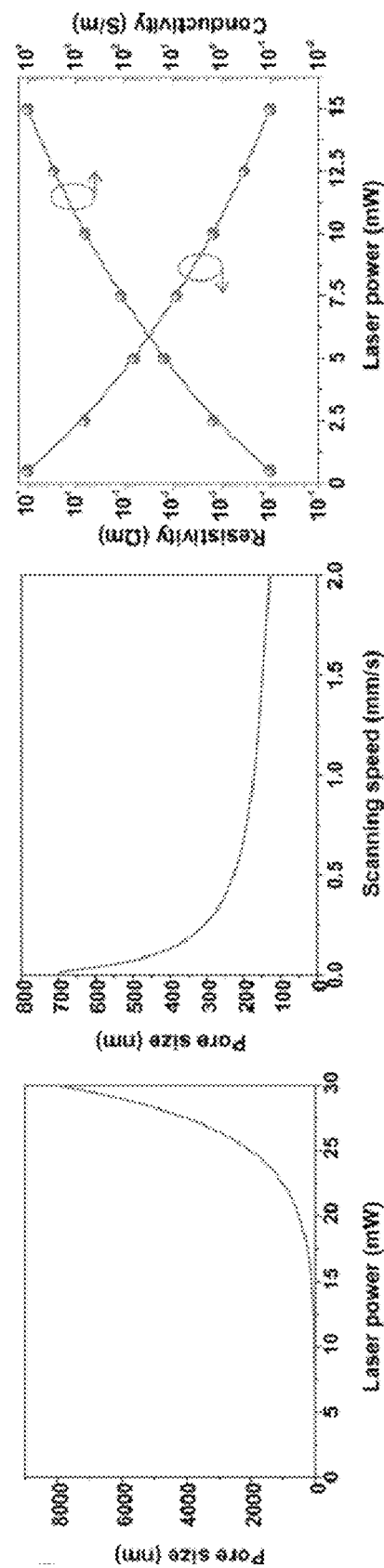

Lateral flux

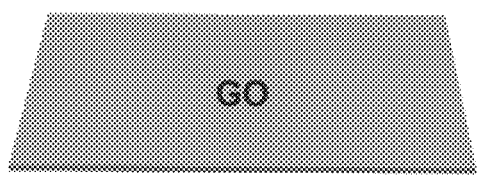
Fig. 15A
Laser beam
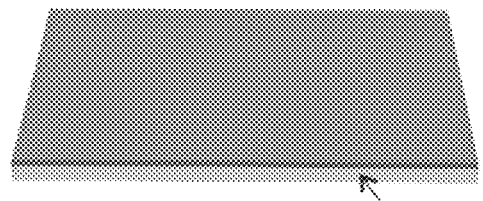
Fig. 15B  Substrate
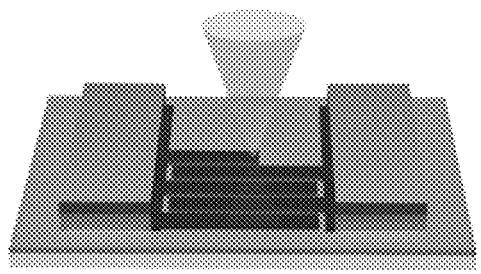
Fig. 15C
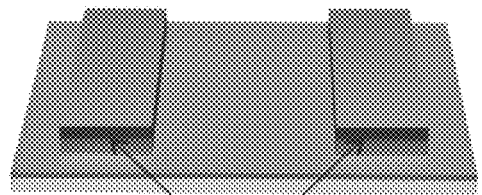
Gold current collectors
Fig. 15D

US 12,272,496 B2

CAPACITORS, ELECTRODES, REDUCED GRAPHENE OXIDE AND METHODS AND APPARATUSES OF MANUFACTURE

RELATED APPLICATIONS

This application is a Continuation of patent application Ser. No. 16/328,570, filed Feb. 26, 2019, entitled "CAPACITORS, ELECTRODES, REDUCED GRAPHENE OXIDE AND METHODS AND APPARATUSES OF MANUFACTURE," which is the National Stage of International Application No. PCT/AU2017/050916, filed Aug. 29, 2017, which claims priority to Australian provisional patent application 2016903449 (filed 30 Aug. 2016), each of which are hereby incorporated by reference in their entirety.

TECHNICAL FIELD

The present invention generally relates to reduced graphene oxide for electrodes for capacitors and supercapacitors, and to methods and apparatuses for making the capacitors, the supercapacitors, and the electrodes.

BACKGROUND

Supercapacitors (also known as "ultracapacitors" or "electric double-layer capacitors") are electrochemical capacitors with capacitance values much higher than other capacitors. Due to their high energy densities, supercapacitors are widely used for energy storage and energy supply.

A typical supercapacitor comprises two electrodes separated by an ion-permeable membrane ("separator"), and a pair of current collectors respectively connected to the electrodes.

For some applications, the electrodes do not have large enough surface areas to achieve a sufficiently high capacitance.

It is desired to address or ameliorate one or more disadvantages or limitations associated with the prior art, or to at least provide a useful alternative.

SUMMARY

In accordance with a first aspect of the present invention, there is provided a method, including:

irradiating graphene oxide (GO) with a beam of light or radiation to form reduced graphene oxide (RGO) in a three-dimensional (3D) pattern, wherein the RGO is porous RGO with pores having sizes tuned by controlling the beam of light or radiation.

In accordance with the present invention, there is further provided an electrode, including reduced graphene oxide (RGO) in a three-dimensional (3D) pattern, wherein the 3D pattern includes a 3D pattern in which anode and cathode are intertwined.

In accordance with the present invention, there is further provided an apparatus for making reduced graphene oxide (RGO), including:
 a container for containing graphene oxide (GO) solution;
 a substrate for receiving the formed RGO;
 an irradiating device for irradiating a beam of light or radiation, which simultaneously crosslinks and reduces the GO, thereby forming RGO.

In accordance with the present invention, there is further provided a method, including:

irradiating a solution, including graphene oxide (GO) and cross-linkers, by a beam of light or radiation to crosslink and reduce the GO simultaneously, thereby forming reduced graphene oxide (RGO).

In accordance with the present invention, there is further provided a method, including:
 irradiating graphene oxide (GO) with a beam of light or radiation to form reduced graphene oxide (RGO), wherein the GO includes a plurality of layers of porous GO film.

In accordance with the present invention, there is further provided a method, including:
 irradiating graphene oxide (GO) with a beam of light or radiation to form reduced graphene oxide (RGO), wherein the GO includes a GO solution.

BRIEF DESCRIPTION OF THE DRAWINGS

Some embodiments of the present invention are hereinafter further described, by way of example only, with reference to the accompanying drawings, in which:

FIG. 4A is a graph of an exemplary relationship between the pore size and laser power;

FIG. 4B is a graph of an exemplary relationship between the pore size and scanning speed;

FIG. 4C is a graph of an exemplary relationship between resistivity and conductivity, and the laser power;

FIG. 7A has a 3D multilayer structure, and FIG. 7B has a 3D intertwined structure;

FIG. 15A, FIG. 15B, FIG. 15C and FIG. 15D are schematic diagrams of an exemplary fabrication process of RGO interdigital supercapacitors including: in FIG. 15A, a free standing graphene oxide film; in FIG. 15B, an exemplary fabrication process of RGO interdigital supercapacitors including the graphene oxide film attached to a flexible substrate; in FIG. 15C, an exemplary fabrication process of RGO interdigital supercapacitors including gold current collectors deposited on the graphene oxide film; and in FIG. 15D, an exemplary fabrication process of RGO interdigital supercapacitors including graphene oxide supercapacitors fabricated by laser patterning;

Figure 18A:
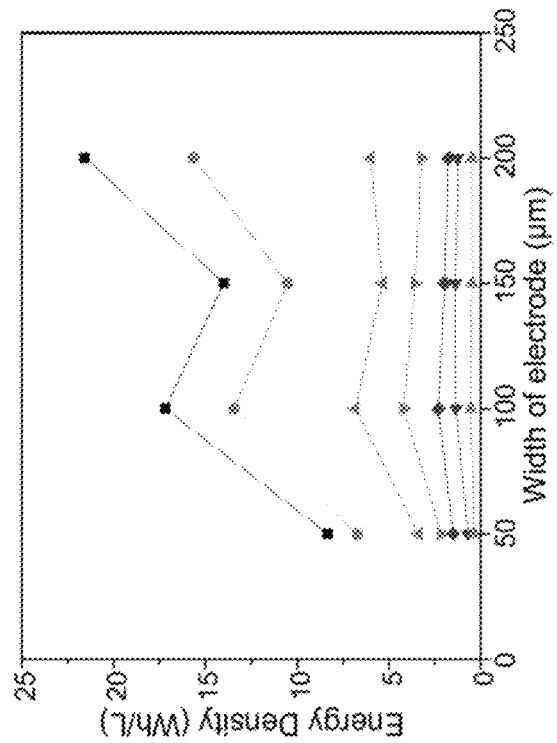
Figure 18B:
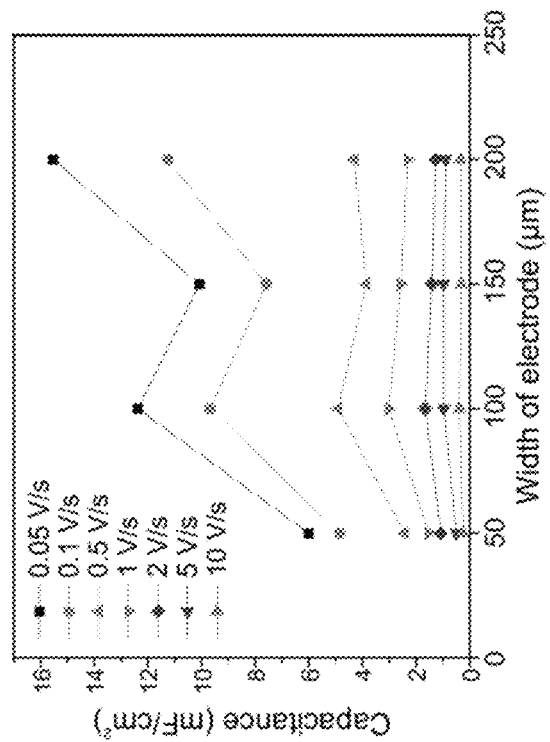
Figure 19:
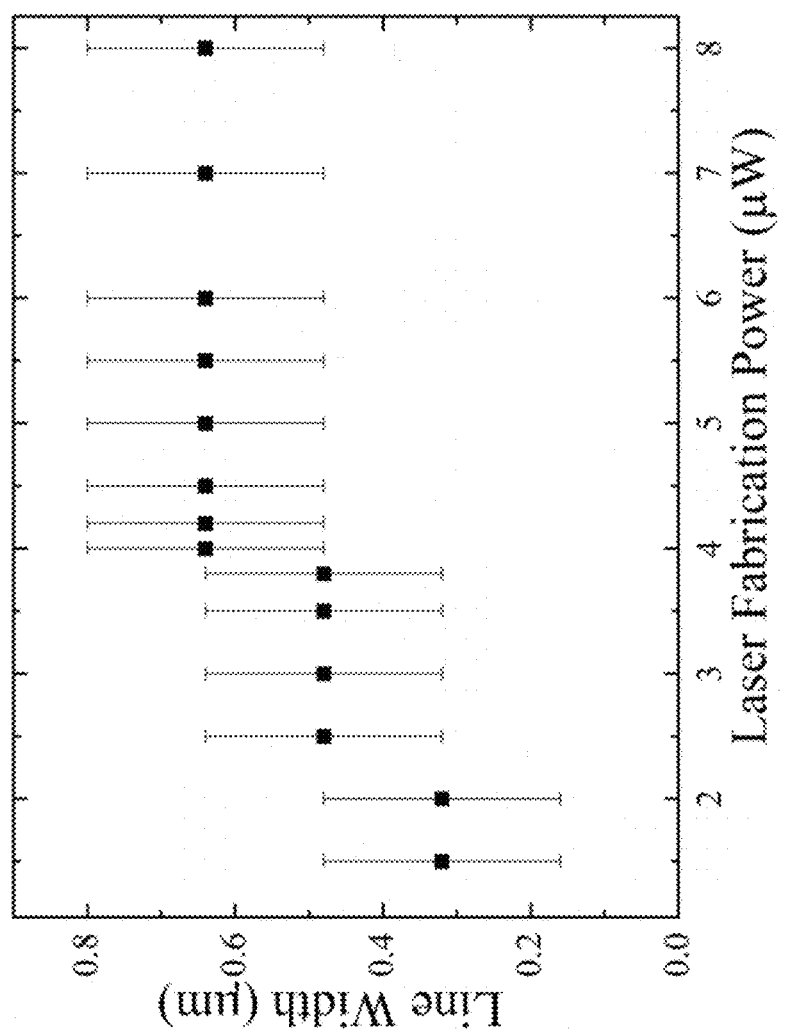
Figure 20B:
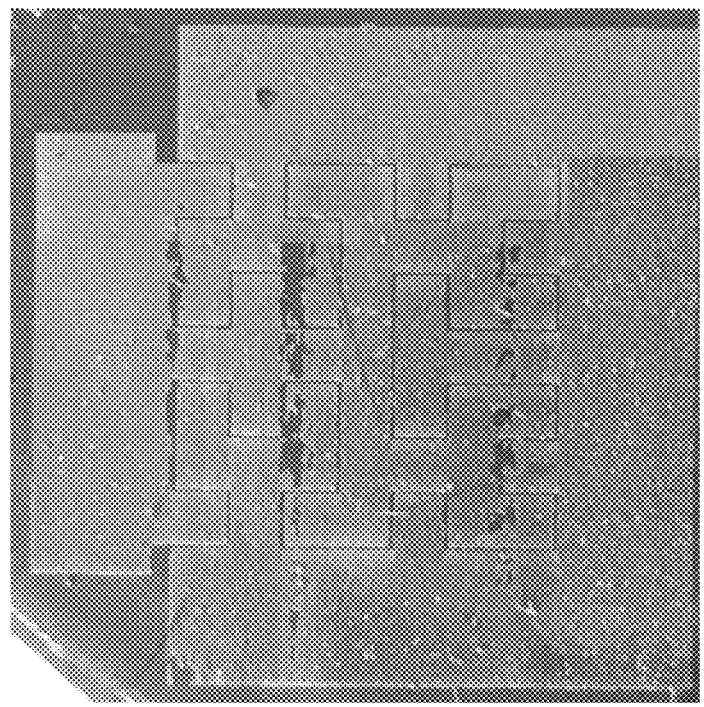
Figure 20A:
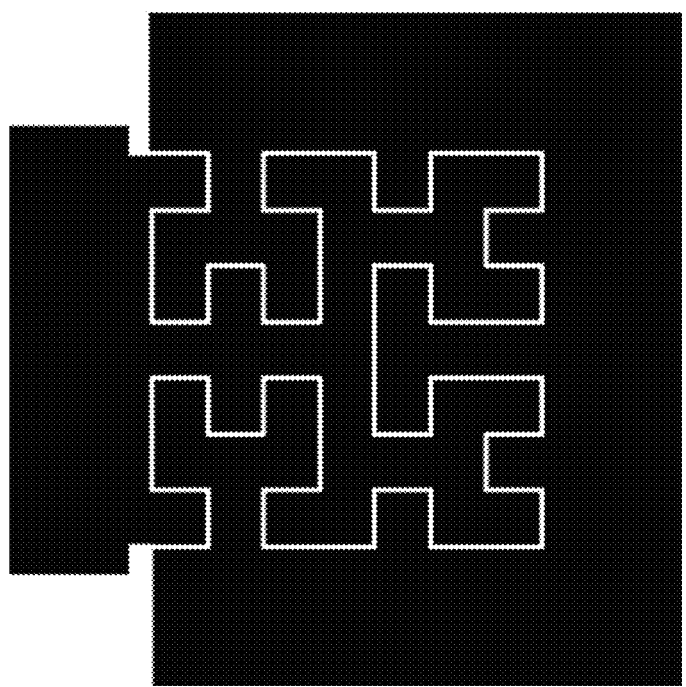
Figure 21:
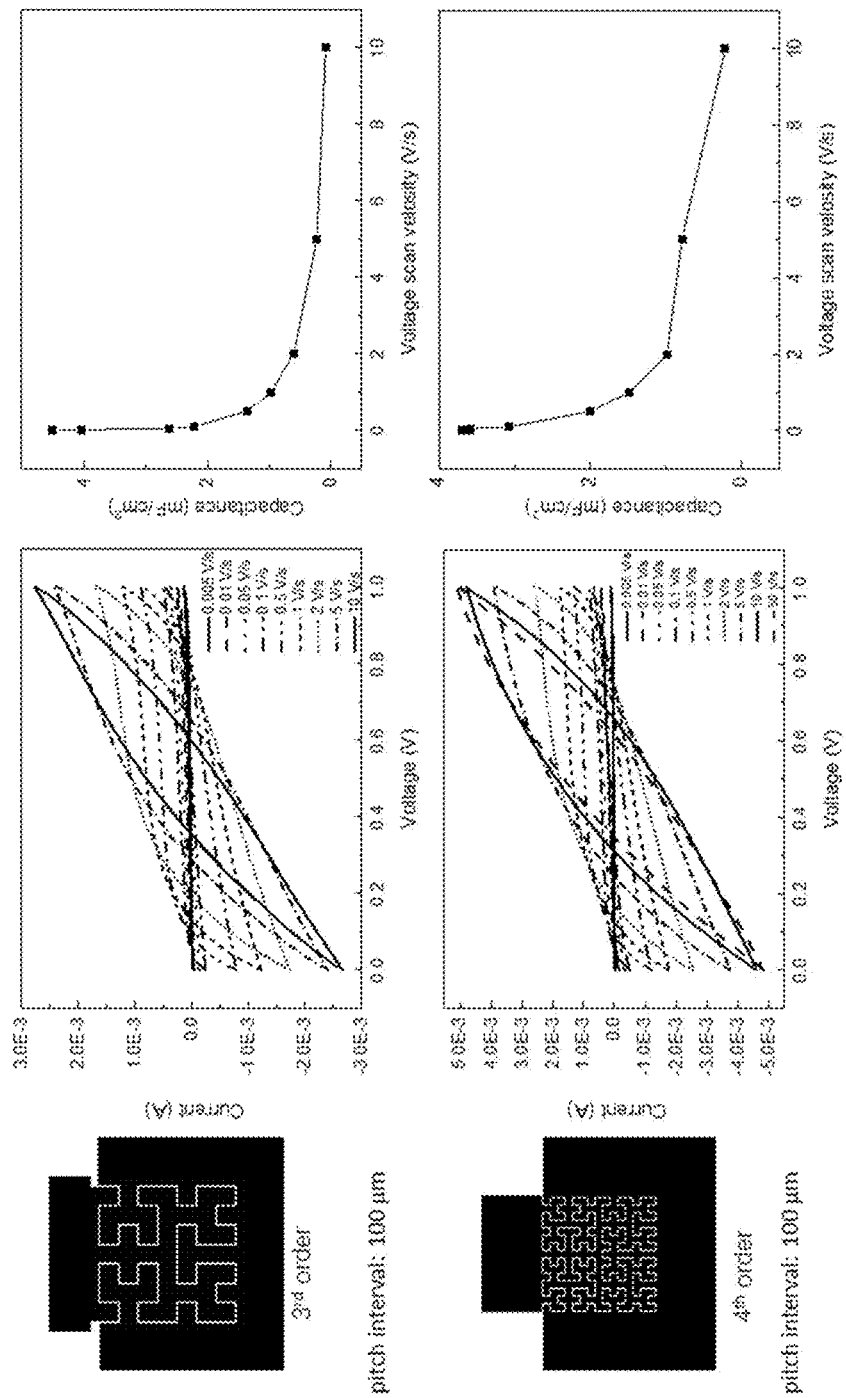

wherein the schematic inset shows different parameters in the RGO supercapacitors;

FIG. 17B, FIG. 17C, FIG. 17D and FIG. 17E are graphs of cyclic voltammetry curves of the graphene oxide supercapacitors with electrode widths of 50 μm, 100 μm, 150 μm, 200 μm;

FIG. 17F, FIG. 17G, FIG. 17H and FIG. 17I are graphs of measured specific capacitances corresponding to FIG. 17B, FIG. 17C, FIG. 17D and FIG. 17E, respectively;

FIG. 18A is a graph of specific capacitances of supercapacitors with different electrode widths at different voltage scan rate;

FIG. 18B is a graph of the energy density of the supercapacitors with different electrode width at different voltage scan rate;

FIG. 19 is a graph of the linewidth of the generated RGO structure for different laser powers;

FIG. 20A is a graph showing a design of a fractal supercapacitor with Hilbert fractal pattern;

FIG. 20B is an optical photo of the fabricated fractal supercapacitor with the design of FIG. 20A; and FIG. 21 are graphs showing two designs of fractal supercapacitors and their measured performances respectively.

DETAILED DESCRIPTION

Overview

Figure 1A:
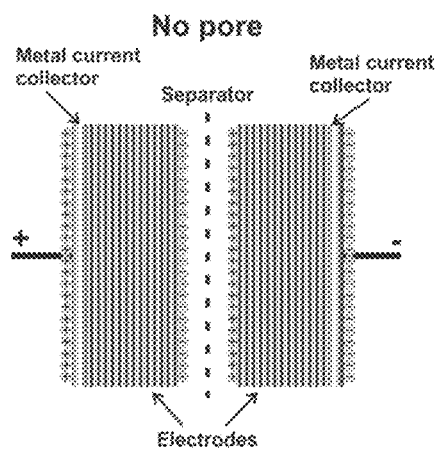
FIG. 1A is a cross-sectional diagram of a capacitor without porous electrodes.

A conventional capacitor, e.g., as shown in FIG. 1A, includes two conventional electrodes, a separator between the two electrodes, and a pair of current collectors (one for each electrode). The conventional electrodes do not have pores, and charge is stored on facing surfaces of the conventional electrodes. The current collectors are electrically connected to the electrodes to conduct charge from and to the electrodes.

Figure 1B:
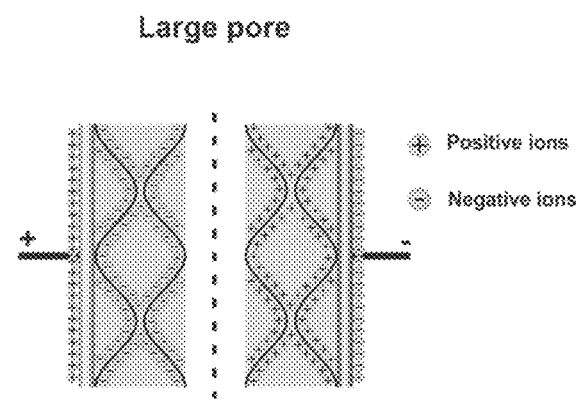
FIG. 1B is a cross-sectional diagram of a supercapacitor including porous electrodes with pores having large sizes.
Figure 1C:
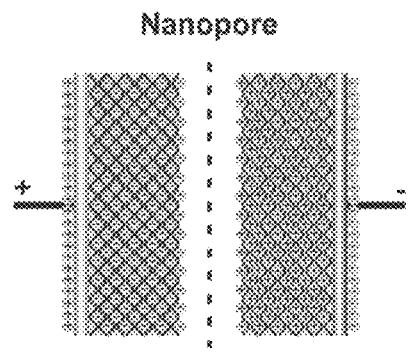
FIG. 1C is a cross-sectional diagram of a supercapacitor including porous electrodes with nanopores.

A supercapacitor, e.g., as shown in FIG. 1B and FIG. 1C, may include porous electrodes, and charge can attach to porous surfaces of the porous electrodes, i.e., in the pores as well as on facing surfaces of the porous electrodes.

The supercapacitor theoretically has a capacitance C proportional to a specific surface area A of the electrodes, i.e., $$C \propto A. \quad (1)$$

The specific surface area A is defined as the total surface area of a material per unit of mass, or solid or bulk volume.

Therefore, the capacitance C can be increased by enlarging the specific surface area A.

Figure 1D:
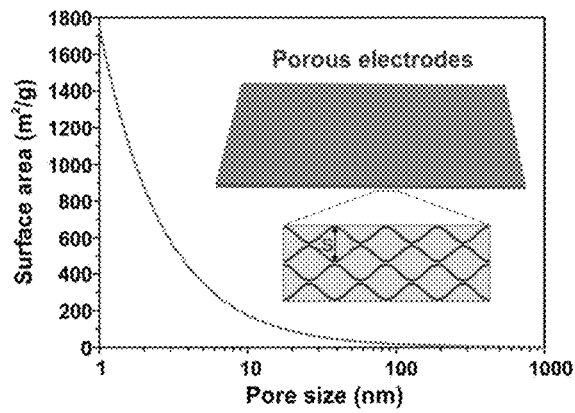
FIG. 1D is a graph of an exemplary relationship of specific surface area of a porous material as a function of pore size.

The specific surface area of a porous material theoretically increases significantly, as pore size decreases. In most circumstances, the specific surface area is inversely proportional to the pore size, e.g., as shown in FIG. 1D for a theoretical pore size defined as a radius of the pores.

Electrodes for supercapacitors may be made from activated carbon, which typically has a complex porous structure that provides a high surface area. However, measured capacitances of supercapacitors with activated carbon electrodes are generally much lower than calculated "theoretical" capacitances, e.g., due to some pores in the activated carbon being too small for electrolyte ions to diffuse into, and because forming a double-layer structure with a narrow distance between the two layers is difficult.

Graphene is an allotrope of carbon. Graphene includes at least one two-dimensional sheet composed of a monolayer of $sp^2$-bonded carbon atoms arranged in a hexagonal honeycomb structure. Graphene has a very stable structure, high conductivity, high toughness, high strength, and a large specific surface area, which can be desirable properties for the electrode material in supercapacitors.

However, making electrodes directly from graphene has challenges or limitations. Despite the large surface areas, supercapacitors formed using a monolayer of graphene may have limited volume capacitance. Although stacks of graphene layers may achieve high volume capacitance, the surface may be poorly accessible to ions due to the small spaces between layers. Furthermore, conventional methods of producing graphene often consume a large amount of energy and involve high costs, thus do not suit mass production.

Graphene oxide ("GO") is an oxidized form of graphene, in which the oxygen containing groups are attached to the graphene basal plane. Graphene oxide can be chemically reduced to convert the graphene oxide to reduced graphene oxide ("RGO"): RGO is a material with higher electrical conductivity than GO.

Described herein is a method for preparing (i.e., making or manufacturing) a reduced graphene oxide structure for porous electrodes for a supercapacitor.

The described method may allow generating one or more pores of a selected size (e.g., having diameters between 1 and 1000 nm, known as "nanopores") between the graphene oxide layers, and allow mass production (i.e., production in large quantities) of the reduced graphene oxide structure and supercapacitor with electrodes having the RGO structure. The described method may also allow simplified (e.g., one-step) fabrication of a supercapacitor having RGO electrodes, with selected properties such as geometric design and/or device footprint (i.e., the amount of space the electrode or the supercapacitor occupies), and allow direct integration of the supercapacitor with other electric devices. Using the described method, supercapacitors with RGO electrodes of selectable two-dimensional (2D) and three-dimensional (3D) structures may be fabricated in a simple, efficient and low-cost manner.

The described method for preparing a reduced graphene oxide structure for porous electrodes for a supercapacitor includes: irradiating GO with a beam of light or radiation to form RGO.

Porous Graphene Oxide (GO) Film

In some embodiments, the GO being irradiated with a beam of light or radiation includes one or a plurality of layers of porous GO film.

The porous graphene oxide film employed in the method of the embodiments described herein comprises a multilayer array comprising graphene oxide sheets.

As used herein, the term "multilayer array" generally refers to an arrangement comprising a plurality of planar graphene-based sheets that are stacked on one another in an overlapping manner to resemble a layered structure. Planar sheets in the multilayer array may partially overlap or completely overlap one another. The multi-layer array is generally a three-dimensional arrangement.

The expression "graphene-based" may be used herein as a convenient reference to material comprising graphene, including graphene oxide and reduced graphene oxide.

Planar sheets in a multilayer may be composed of graphene oxide (e.g. in the case of a graphene oxide film). Alternatively, the sheets may be composed of reduced graphene oxide or mixtures of graphene oxide and reduced graphene oxide (e.g. in the case of a reduced graphene oxide film).

The porous graphene oxide film used herein comprises graphene oxide sheets, wherein at least some of the graphene oxide sheets comprise one or more pores. In some embodiments, a portion of the graphene oxide sheets in the multilayer array comprise at least one pore, while a further portion of the graphene oxide sheets do not comprise a pore. In other embodiments, each graphene oxide sheet in the graphene oxide film comprises at least one pore. A skilled person would appreciate that an individual graphene oxide sheet in the graphene oxide film can comprise a plurality of pores.

Pores in a graphene oxide sheet are carbon atoms vacancies in the plane of the sheet, which disrupt the regular hexagonal carbon lattice of the sheet. Such pores may be distributed randomly or with high regularity in a graphene oxide sheet. Depending on their diameters, the pores may be classified as micropores (diameters below 2 nm), mesopores (diameters in the range of from about 2 nm to about 50 nm) or macropores (diameters above 50 nm).

Graphene oxide sheets in the porous graphene oxide film are also separated or spaced apart from one another in the multilayer structure. Accordingly, an interlayer space exists between the graphene oxide sheets. The extent (i.e. distance) by which graphene oxide sheets are separated from one another when in the graphene oxide film may be referred to herein as the separation distance or interlayer spacing between the sheets.

The porous graphene oxide film employed in the process of the embodiments described herein comprises at least one oxygen containing functional group. In some embodiments, the graphene oxide film may comprise a plurality of oxygen containing functional groups. Such oxygen containing functional groups are generally present in at least one graphene oxide sheet that forms part of the porous graphene oxide film.

As used herein, the term "oxygen containing functional group" is generally a reference to functional groups such as epoxides, hydroxyls, ketones, ketone pairs, phenols, carboxyls, cyclic ethers and the like, that are covalently bound to a carbon atom of a graphene oxide sheet. Such oxygen containing functional groups may be a result of oxidation reactions.

In one set of embodiments, the porous graphene oxide film comprises an oxygen containing functional group situated in at least one selected from (i) a pore of a graphene oxide sheet and (ii) between two or more graphene oxide sheets.

In one set of embodiments, the porous graphene oxide film comprises an oxygen containing functional group situated both in a pore of a graphene oxide sheet and in between two or more graphene oxide sheets.

Oxygen containing functional groups situated in a pore of a graphene oxide sheet may be positioned at the edge of the pore. Pores in a graphene oxide sheet may comprise at least one oxygen containing functional group and may comprise a plurality of oxygen containing functional groups. When an individual graphene oxide sheet comprises a plurality of pores, each pore may comprise at least one oxygen containing functional group.

Oxygen containing functional groups that are situated in between two or more graphene oxide sheets may be covalently bound to a surface of a graphene oxide sheet and extend from the basal plane of the graphene oxide sheet into the interlayer space that exists between overlapping sheets. In this manner, overlapping graphene oxide sheets can be spaced apart or separated from one another by the oxygen containing functional groups. The porous graphene oxide film comprises at least one oxygen containing functional group, and may comprise a plurality of oxygen containing functional groups, situated in between two or more graphene oxide sheets.

In one set of embodiments, porous graphene oxide films useful for the embodiments described herein have a high oxidation degree. A porous graphene oxide film having a high oxidation degree may comprise an amount of oxygen containing functional groups to provide an oxygen content of at least about 15%, preferably at least about 20%, more preferably at least about 25%, in the graphene oxide film.

The oxygen content of the porous graphene oxide film may be determined by suitable techniques. For example, oxygen content and hence oxidation degree may be determined by X-ray photoelectron spectroscopy (XPS), which measures the type and percentage of each type of chemical element present in a material. In one form, graphene oxide sheets forming the graphene oxide film have a carbon to oxygen (C:O) ratio as determined by XPS in a range of from about 2:1 to about 4:1, preferably from about 2.5:1 to 3:1.

Porous graphene oxide films with a high oxidation degree may have a large number of pores in the graphene oxide sheets as well as a large interlayer spacing between the sheets. For instance, a porous graphene oxide film with a high degree of oxidation may have graphene oxide sheets that are separated by a distance of up to 8 Å.

Further, porous graphene oxide films with a high oxidation degree may have a high electric resistivity. In some embodiments, the graphene oxide film without reduction may be used as the separator of a supercapacitor, which requires high electric resistivity to prevent self-discharge. Thus, the use of a graphene oxide film with a high oxidation degree (e.g., about 28%) may be advantageous.

The porous graphene oxide film employed in the process of the embodiments described herein may be obtained from commercial sources. Alternatively, the porous graphene oxide film may be synthesised from graphite, for example, by generating GO film from GO solution.

Graphite Oxide (GO) Solution

The GO solution used for forming the GO film may be prepared by:
- oxidising graphite to form oxidised graphite;
- exfoliating the oxidised graphite in a solvent to form a graphene oxide solution.

An exemplary process of preparing the graphene oxide solution is described below.

Oxidisation of Graphite

In some embodiments, purified natural graphite powder (e.g., natural graphite powder of ultrahigh purity) may be used to for oxidised graphite.

Graphite may be oxidised using conventional methods to produce graphite oxide. In some embodiments, oxidising methods such as Hummers method (Journal of the American Chemical Society, 1958, 80(6), 1339) or modified Hummers method (ACS nano, 2010, 4(8), 4806) may be employed.

Exfoliation of Graphite Oxide

The graphite oxide that is produced from the oxidation of graphite comprises a plurality of planar graphene oxide sheets, with each of the graphene oxide sheets comprising at least one oxygen containing functional group.

The graphite oxide is exfoliated to produce sheets of graphene oxide. The exfoliation of the graphite oxide may be performed using exfoliation techniques and conditions known in the art.

In some embodiments, the graphite oxide can be suspended in a solvent and exfoliated in the solvent under conditions sufficient to cause separation of the graphene oxide sheets, resulting in the formation of a graphene oxide solution. The graphene oxide solution comprises separated sheets of graphene oxide suspended in the solvent. The separated graphene oxide sheets may be in monolayer or few-layer form.

The graphite oxide may be suspended in any suitable solvent. In one set of embodiments, the graphite oxide is suspended in an aqueous solvent. In one embodiment the aqueous solvent is substantially free of organic solvent. In one preference, the aqueous solvent is water. The use of an aqueous solvent allows the graphene oxide film to be prepared in an environmentally friendly manner.

The exfoliation of graphite oxide in a solution can be performed using a suitable exfoliation technique.

In one set of embodiments, a graphite oxide in a solution may be subjected to mechanical exfoliation to produce graphene oxide sheets, which are then dispersed in the solvent. Mechanical exfoliation may be achieved using sonication.

A person skilled in the art would appreciate that sonication involves the application of sound energy to agitate the graphite oxide and ultimately result in disruption of the graphene oxide lattice layers in the graphite material. Disruption of the lattice layers leads to separation of the layers of graphene oxide sheets. Sonication means and conditions known to be useful for exfoliating graphite oxide may be used. Sonication may be performed with a sonifier or sonication bath.

In some embodiments, graphite oxide may be sonicated at a frequency in a range of from about 20 kHz to about 400 kHz, preferably at a frequency of about 20 kHz.

In one set of embodiments, graphite oxide is ultrasonicated to produce graphene oxide sheets.

Sonication may be carried out for a time period ranging from seconds to hours. Time periods may vary depending on for example, the quantity of graphite oxide to be exfoliated and the frequency of sonication. In one set of embodiments, the graphite oxide may be sonicated for a time period in a range of from about 5 minutes to several hours, preferably from about 20 minutes to about 1 hour, more preferably for about 30 minutes.

After exfoliation of the graphite oxide in solution, a graphene oxide solution is then formed. The graphene oxide solution may comprise graphene oxide in monolayer and/or in few-layer form. Few-layer form may comprise from 2 to 10 graphene-based sheets.

At least some of the graphene oxide in the graphene oxide solution comprise at least one pore. In some embodiments, at least some of the graphene oxide in the solution comprise a plurality of pores. The pores may arise as a result of defects that are introduced in the sheets of graphene oxide.

The graphene oxide solution can be used to form a porous graphene oxide film. The graphene oxide film may be prepared using conventional film formation techniques that would be known to a skilled person.

Formation of the Porous GO Film

The graphene oxide film may be formed by film formation techniques that would be known to a skilled person.

In one set of embodiments, formation of a porous GO film involves applying a graphene oxide solution to a substrate to form a coating and removing the solvent from the coating to leave a porous graphene oxide film on the substrate. If desired, the resulting graphene oxide film may be removed from the substrate. For example, the film may be peeled off the substrate.

In some embodiments, the porous graphene oxide film may be prepared by at least one film forming technique selected from filtration, spin coating, spray coating and drop casting.

Filtration

In one set of embodiments, a graphene oxide solution is subjected to a filtration process to form a porous graphene oxide film. An example of a filtration process is described in Dikin, D. A. et al, Nature 448, 457-460 (2007). The graphene oxide solution may be passed through a filter substrate in order to form a porous graphene oxide film. The porous graphene oxide in the solution is thereby retained on the filter substrate while the solvent passes through. Filtration of the graphene oxide solution may be aided by a vacuum filtration apparatus. The overall dimensions of the porous graphene oxide film may be influenced by the filtration setup, including the size of the filter substrate, while the thickness of the graphene oxide film may be controlled by adjusting the amount of graphene oxide in the solution and the time of filtration. A free-standing (i.e. unsupported) porous graphene oxide film may be produced by removing the as prepared film from the filter substrate.

Spray Coating

In one set of embodiments, formation of the porous graphene oxide film may involve a spray coating process. An example of a spray coating process is described in Moon, In Kyu, et al, Scientific Reports 3 (2013). In some embodiments, a graphene oxide solution is sprayed onto a substrate to form a porous graphene oxide film. The graphene oxide solution may be sprayed onto the substrate using a suitable spray device, such as a spray gun. The sprayed graphene oxide solution thereby coats the surface of the substrate. In carrying out the process, the substrate may be heated to allow the solvent from the sprayed graphene oxide solution to be rapidly removed by evaporation after the coating is applied. When the solvent is an aqueous solvent (for example, water), the substrate may be heated at a temperature of up to about 80° C. The thickness of the porous graphene oxide film may be controlled by the concentration of graphene oxide in the solution and/or the amount of graphene oxide solution applied to the substrate. Application of the graphene oxide solution can be controlled by adjusting the flow rate of the solution and/or the spray time. The flow rate of the graphene oxide solution spray can be controlled by the nozzle size of the spray device and the pressure at which the spray of graphene oxide solution is applied.

Spin Coating

In one set of embodiments, formation of the porous graphene oxide film may involve a spin coating process. Spin coating may be used to deposit uniform thin graphene oxide film onto flat substrates. An example of spin coating process is described in Guo, Yunlong, et al, ACS nano 4.10 (2010): 5749-5754. In some embodiments, a graphene oxide solution may initially be applied to a stationary or spinning substrate that is rotating at a low speed. The substrate is subsequently rotated at high speed in order to spread the graphene oxide solution on the substrate by centrifugal force. Rotation is continued while the fluid spins off the edges of the substrate, until the desired film thickness is achieved. The thickness of porous graphene oxide film may be controlled by the spinning speed, which can vary from 400 to 6000 revolutions per minute (rpm).

Drop Casting

In one set of embodiments, formation of the porous graphene oxide film may involve a drop casting process. An example of a drop casting process is described in El-Kady, Maher F., et al, Science 335.6074 (2012): 1326-1330. In such embodiments, a graphene oxide solution may be dropped onto a substrate to form a coating on the substrate. The coating is then dried under ambient atmospheric conditions to remove the solvent from the coating and form a graphene oxide film. To accelerate the drying process, a flow of air may be passed over the coating. The size of the substrate and/or the size of the drops may determine the size of the porous graphene oxide film. The thickness of the graphene oxide film may be determined by the concentration of graphene oxide in the solution.

Spacers

In one form of the embodiments, the porous graphene oxide film may further comprise one or more spacers. When present, the spacers are generally situated in between two or more graphene oxide sheets of the graphene oxide film.

Spacers may be derived from one or more suitable spacer compounds. For example, spacers may be polymeric spacers, which are derived from one or more polymeric compounds. When present, spacers may act in conjunction with oxygen containing functional groups to control the interlayer spacing between graphene oxide sheets in the graphene oxide film. For instance, spacers may help to enlarge the interlayer spacing between graphene oxide sheets, such that the separation distance between the sheets is greater than that observed without the spacer.

Depending on the nature of the spacer, the mechanical properties of the porous graphene oxide film and consequently, the porous reduced graphene oxide film, may be altered by the presence of the spacer.

In some embodiments, spacers can act to crosslink graphene oxide sheets, such that a porous crosslinked graphene oxide film is then produced. In this manner, at least two graphene oxide sheets in the multilayer array may be covalently bonded together via crosslinks provided by the spacer.

In some embodiments, a porous crosslinked graphene oxide film comprises at least one graphene oxide sheet that is crosslinked to a graphene oxide sheet overlapping it via a spacer. Preferably, the spacer is bonded to each of the graphene oxide sheets and extends between the graphene oxide sheets.

In embodiments, crosslinking occurs prior to the reduction process so as to produce a porous crosslinked graphene oxide film. A crosslinked graphene oxide film may help to ensure that the resulting porous reduced graphene oxide film formed after the reduction process maintains its physical integrity and does not degrade or dissolve when in use.

Spacer compounds useful for producing a porous crosslinked graphene oxide film may be of any suitable molecular weight or size. The size of the spacer compound may influence the interlayer spacing and hence separation distance between graphene oxide sheets, with larger (i.e. higher molecular weight) spacers giving rise to larger separation distances.

Crosslinking of the porous graphene oxide film may proceed via covalent or non-covalent bonding interactions, or mixtures thereof.

A porous covalently crosslinked graphene oxide film may be produced when a spacer compound contains functional groups that are capable of covalently reacting with oxygen containing functional groups (such as epoxy or carboxyl functional groups) present on a surface of a graphene oxide sheet, resulting in covalent attachment of the spacer to the graphene oxide sheet.

A spacer compound may have any suitable functional group. In some embodiments, the spacer compound may comprise a functional group selected from the group consisting of hydroxy, amino, amido and thiol, and mixtures thereof. A spacer compound may be multifunctional and may comprise two or more of these functional groups.

Metal nanoparticles that are capable of covalently bonding with oxygen containing functional groups of a graphene oxide sheet may also be used as spacer compounds.

In one set of embodiments, the spacer compound may be a polyol. Accordingly, the graphene oxide film may comprise a spacer derived from at least one polyol compound.

Polyol compounds are multifunctional and comprise two or more hydroxy functional groups. The hydroxy functional groups are generally terminal functional groups. Polyol compounds suitable as spacers for the graphene oxide film may comprise two, three, four or more hydroxy functional groups.

When a polyol compound is used as a spacer compound, covalent attachment of the polyol to a graphene oxide sheet may be via functional groups, such as ester (—C(O)O), ether (—O—) or anhydride (—(O)COC(O)—) groups, formed between the polyol and the graphene oxide sheet.

When covalent reactions occur between a polyol compound comprising at least two terminal hydroxyl functional groups and two separate overlapping graphene oxide sheets, a crosslink can be formed between the graphene oxide sheets. For instance, a first terminal hydroxyl group on the polyol compound may covalently react with an oxygen containing functional group on a first graphene oxide sheet while a second terminal hydroxyl group on the polyol compound covalently reacts with an oxygen containing functional group on a second graphene oxide sheet. The polyol therefore extends between the first and second graphene oxide sheets and acts as a crosslinker between the graphene oxide sheets.

In some embodiments, the porous graphene oxide film may comprise a spacer derived from a polyol compound selected from the group consisting of ethylene glycol (EG), 1,2-propylene glycol (PG), butylene glycol (BG), 1,6-hexylene glycol (HG), neopentyl glycol (NPG), glycerol (GL), pentaerythritol (PER), and mixtures thereof. Thus the porous graphene oxide film may comprise one or more spacers derived from at least one or a mixture of the aforementioned polyols.

A porous non-covalently crosslinked graphene oxide film may be produced when a spacer compound is capable of interacting with a graphene oxide sheet via non-covalent bonding interactions. Examples of a non-covalent bonding interaction include ionic, hydrogen bonding and Van der Waals interactions. The spacer is therefore bound to the graphene oxide sheets via non-covalent bonds and crosslinks overlapping graphene oxide sheets via the non-covalent bonds, producing a porous non-covalently crosslinked graphene oxide film.

In one set of embodiments, the porous graphene oxide film is crosslinked via ionic or electrostatic interactions. In such embodiments, the porous graphene oxide film may comprise a spacer derived from an ionisable spacer compound.

An ionisable spacer compound is a compound that is capable of carrying a net charge at a selected pH. Ionisable spacer compounds may comprise functional groups such as carboxylic acid, carboxylic acid ester, amino, amido, nitro, phospho, sulpho, thiol, and the like.

In some embodiments, the ionisable spacer compound may be selected from the group consisting of pyrenebutanoic acid succidymidyl ester, 1,5-diaminonaphthalene (DAN) and 1-nitropyrene (NP), polydimethylsiloxane (PDMS) and DNA.

The crosslinking of a porous graphene oxide film may be achieved using a range of techniques. In one set of embodiments, crosslinking may be achieved by adding a suitable spacer compound to a graphene oxide solution. A porous graphene oxide film is then prepared from the solution. The spacer compound interacts with graphene oxide sheets present in the graphene oxide solution by covalent or non-covalent bonding interactions and becomes arranged in between sheets of graphene oxide during formation of the graphene oxide film. The resulting porous graphene film is then crosslinked by the spacer. The crosslinked graphene oxide film may then be subsequently subjected to a reduction process, as described below.

Crosslinking of the porous graphene oxide film may also proceed under suitable conditions. In one set of embodiments, crosslinking is facilitated by the application of heat.

Self-Assembly

In some embodiments, a porous crosslinked graphene oxide film may be prepared by layer-by-layer (LbL) self-assembly of alternating layers of a spacer material and suitable graphene oxide sheets. Thus in one set of embodiments, formation of a porous crosslinked graphene oxide film involves subjecting the graphene oxide solution to a self-assembly process. A self-assembly process may enable a porous graphene oxide film of controlled thickness to be prepared.

A self-assembly process for the formation of a porous graphene oxide film may comprise the following steps:
 (1) providing a negatively charged surface;
 (2) depositing a layer of positively charged material onto the negatively charged surface to form a positively charged surface; and
 (3) depositing a layer of negatively charged graphene oxide sheets onto the positively charged surface.

The negatively charged graphene oxide layer may provide a negatively charged surface on to which another layer of positively charged material may be subsequently deposited. The alternating layers of positive charged and negative charged material are bound to each other via electrostatic interactions.

A porous graphene oxide film formed by layer-by-layer assembly may be supported by a suitable substrate. The substrate may provide an initial charged surface on which a layer of graphene oxide or polymer may be deposited when the layer-by-layer assembly process is commenced. The resulting porous graphene oxide film is therefore bound to the underlying substrate via electrostatic interactions. Any suitable substrate may be used. In one set of embodiments, the substrate is a glass substrate.

The deposition of a layer of a positively charged material may be achieved through the use of a solution comprising an appropriately charged compound or molecule. For example, a substrate having a negatively charged surface may be immersed in a solution comprising a positively charged material, such as a positively charged compound or a positively charged polymer. This leads to deposition of a layer of the positively charged material onto the negatively charged surface and the formation of a positively charged surface.

Following deposition of the positively charged material, a layer of negatively charged graphene oxide is then deposited onto the positively charged surface. Deposition of the negatively charged graphene oxide layer may be achieved through the use of a graphene oxide solution as described herein. For example, a substrate having a positively charged polymer-modified surface may be immersed in a graphene oxide solution comprising sheets of a negatively charged graphene oxide. This leads to deposition of a layer of graphene oxide onto the positively charged surface and the formation of a negatively charged graphene oxide surface.

The alternating deposition of layers of positively charged material and negatively charged graphene oxide may be repeated a number of times to assemble a porous graphene oxide film having layers of material interspersed in between layers of graphene oxide sheets. Each layer of material may act as a spacer to separate and space apart the layers of graphene oxide. The number deposition steps determine the thickness of the graphene oxide film.

Pores are introduced to the self-assembled graphene oxide film through pores present in the graphene oxide material forming the graphene oxide layer that is part of the film structure.

In between each deposition step, any unattached material (e.g. unattached polymer or unattached graphene oxide) may be removed by washing the substrate-supported sample.

Once the desired number of layers has been achieved, the porous graphene oxide film may then be dried. Sample drying may be carried out with compressed air or a flow of nitrogen gas.

In one set of embodiments, positively charged material useful for the production of a porous graphene oxide film by self-assembly comprises a functional group that is capable of carrying a net positive charge at a selected pH. In one embodiment, the positively charged material may comprise a nitrogen-containing functional group that is ionised at a selected pH to form a cationic group carrying a positive charge. Nitrogen-containing functional groups present in the positively charged material may be primary, secondary or tertiary amino groups, amido groups, imino groups and the like. In some embodiments, the positively charged material may be positively charged polymer such as polyethylenimine (PEI), polydiallyldimethylammonium chloride (PDDA), poly[2-(N,N-dimethylamino)ethyl methacrylate] (PDMAEMA) and chitosan, or a positively charged compound such as chlorophyll. In one preference, the positively charged material is a positively charged polymer.

Formation of RGO

The method of the embodiments includes irradiating the GO film or GO solution with a beam of light or radiation to form RGO. The irradiation process for reducing graphene oxide may also be referred to below as "photo reduction" or "3D laser printing".

The reduction process can reduce one or more oxygen containing functional groups present in one or more GO sheets within the porous GO film. In some embodiments, the reduction process reduces at least one oxygen containing functional group in a plurality of GO sheets.

During the reduction process of the embodiments, an oxygen containing functional group situated (i) in a pore of a graphene oxide sheet and/or (ii) in between two or more graphene oxide sheets is reduced.

The reduction process may therefore reduce an oxygen containing functional group situated either in a pore of a graphene oxide sheet or in between graphene oxide sheets, and in some embodiments, the irradiation reduces at least a portion of the oxygen containing functional groups between the graphene oxide sheets.

Alternatively, the reduction process reduces oxygen containing functional groups present both in a pore of a graphene oxide sheet and in between graphene oxide sheets.

The reduction of an oxygen containing functional group removes that functional group from a graphene oxide sheet and results in the formation of a reduced graphene oxide sheet.

Following the reduction process, a porous reduced graphene oxide film is produced. The porous reduced graphene oxide film comprises at least one reduced graphene oxide sheet and may comprise a plurality of reduced graphene oxide sheets. A reduced graphene oxide sheet is formed when at least one oxygen containing functional group in a graphene oxide sheet is reduced and removed.

It would be appreciated by a skilled person that it is not essential to the embodiments that all the graphene oxide sheets in the porous graphene oxide film be reduced. However, the process of the embodiments provides that at least one of the graphene oxide sheets in the film is reduced.

In some embodiments, a portion of the graphene oxide sheets in the porous graphene oxide film are reduced. In such embodiments, the resultant film comprises a mixture of graphene oxide sheets and reduced graphene oxide sheets. The resultant film may therefore be a partially reduced graphene oxide film. However, such partially reduced films are still regarded as reduced graphene oxide films in accordance with the embodiments.

In some embodiments, each of the graphene oxide sheets in the graphene oxide film is reduced.

Reduced graphene oxide sheets present in a porous reduced graphene oxide film are also part of a multilayer array.

A skilled person would understand that the reduction process conditions can be adjusted so as to vary the amount of oxygen containing functional groups that are reduced and thus alter the degree or extent of reduction. As explained further below, changes in the degree of reduction can enable the properties (which may include one or more of the following: pore/defect size, layer spacing, electrical conductivity, hydrophilicity, surface charge properties, surface roughness, or mechanical properties) of the porous reduced graphene oxide film to be adjusted.

In some embodiments, the process of the embodiments may selectively reduce an oxygen containing functional group that is located in a pore or in an interlayer space of the porous graphene oxide film. The selectivity may be possible as the type of oxygen containing functional groups present in a pore may be different from that in an interlayer space. For instance, a porous graphene oxide film as described herein may comprise hydroxyl and epoxy functional groups attached to the basal plane of a graphene oxide sheet, which extend into the interlayer space in between graphene oxide sheets. Meanwhile, carbonyl and carboxyl functional groups may be attached to a defect edge of a graphene oxide sheet and thus such functional groups may be present in a pore of the graphene oxide sheet.

Reduction processes described herein may be capable of distinguishing between different types of oxygen containing functional groups and thus the process of the embodiments may be able to selectively reduce different oxygen containing functional groups that are positioned at different locations in a graphene oxide film.

The reduction of an oxygen containing functional group in accordance with the process of the embodiments results in the removal of that oxygen containing functional group and $sp^3$ carbon atoms from the graphene oxide sheet and the formation of more hydrophobic graphene domains.

The reduction of an oxygen containing functional group that is situated in a pore of a graphene oxide sheet results in a change in the size of the pore. This change in pore size occurs due to the removal of the oxygen containing functional group. In one set of embodiments, the pore size (determined as pore diameter) of a reduced graphene oxide sheet is increased in comparison to the original pore size in the corresponding graphene oxide sheet.

The reduction of an oxygen containing functional group that is situated in between graphene oxide sheets produces in a change in the separation distance or interlayer spacing between the sheets, as the oxygen containing functional group is removed from the basal plane of a graphene oxide sheet. The reduced graphene oxide sheet that is formed after the reduction step is therefore separated from a graphene-based sheet that overlaps it by a different distance, compared to the original corresponding graphene oxide sheets in the graphene oxide film prior to the reduction process. In one set of embodiments, the separation distance between a reduced graphene oxide sheet and a sheet overlapping is reduced.

Any change in the pore size and/or the sheet separation distance is determined by comparison to a corresponding graphene oxide sheet that is present in the porous graphene oxide film prior to the reduction process. A "corresponding" graphene oxide sheet relates to a selected reduced graphene oxide sheet in that it is positioned at the same location as that reduced graphene oxide sheet within the multilayer array. Thus the corresponding graphene oxide sheet is the original, oxidised graphene sheet prior to it being subjected to the reduction process.

Accordingly, a selected pore in a reduced graphene oxide sheet will be compared to a corresponding pore in the graphene oxide sheet prior to the reduction process being performed, and any change in pore size (diameter) following reduction will be ascertained relative to the size of the original pore in the graphene oxide sheet.

Similarly, the separation distance between selected graphene-based sheets in a porous reduced graphene oxide film will be compared to the separation distance between corresponding graphene oxide sheets prior to the reduction process being performed, and any change in the separation distance between selected sheets following reduction will be ascertained relative to the original separation distance between equivalent sheets in the graphene oxide film.

In one set of embodiments, the porous reduced graphene oxide film comprises a plurality of reduced graphene oxide sheets, where the separation distance or interlayer spacing between the reduced graphene oxide sheets is decreased, relative to that of the corresponding graphene oxide sheets in the graphene oxide film prior to the reduction process.

Changes in the pore size and/or the separation distance produced as a result of the reduction process allow the properties (the properties may include one or more of the following: pore/defect size, layer spacing, electrical conductivity, hydrophilicity, surface charge properties, surface roughness, or mechanical properties) of the porous reduced graphene oxide film to be adjusted. In some embodiments, the reduction process may selectively reduce oxygen containing functional groups situated in one or more pores and/or in between two or more sheets of graphene oxide to enable the pore size and/or interlayer spacing to be controlled.

As previously mentioned, the GO film or GO solution is irradiated with a beam of light or radiation to form the RGO. The irradiation may induce a thermal (i.e. photo-thermal) or chemical (i.e. photo-chemical) effect, which reduces at least one oxygen containing functional group present in the porous graphene oxide film.

Photo-thermal reduction may involve the use of the light or radiation to irradiate the porous graphene oxide film and generate localized heat in the film. The heat that is generated following irradiation depends on the source of the light or radiation and thermal properties of the graphene oxide film. Parameters such as the wavelength and/or intensity of the source and the time (i.e. duration) of irradiation can influence the pore size and/or the interlayer spacing of the porous reduced graphene oxide film due to the amount of thermal energy (or heat) that is generated. In one embodiment, photo-thermal reduction is performed in a substantially oxygen-free environment, such in a vacuum or in an inert atmosphere such as a nitrogen or argon atmosphere. In photo-thermal reduction, the light or radiation can include different forms of electromagnetic radiation, including optical radiation.

Photo-thermal reduction may be performed using light or radiation of any suitable wavelength. Suitable wavelengths may vary from the UV range (approximately 10 nm) up to the infrared range (approximately 100 μm).

In some embodiments, suitable wavelengths may be from approximately 248 nm up to 10.6 μm from a $CO_2$ laser.

Photo-thermal reduction may be performed using any suitable type of light or radiation source. A suitable light or radiation source preferably has sufficient power to generate a minimum amount of heat. In some embodiments, a suitable light or radiation source has sufficient power to heat the porous graphene oxide film to a temperature of at least about 200° C. during the reduction process. Some examples of light sources that may be used facilitate photo-thermal reduction include but are not limited to UV lamps, focused sunlight and flash lights.

Photo-thermal reduction of the porous graphene oxide film can involve irradiation of the graphene oxide film with a beam of light or radiation with sufficient irradiance to generate the minimum amount of heat. A suitable spot size can be selected based on the radiant power of the source of the light or radiation—i.e., the provided light or radiation source—to provide sufficient radiant flux (power) at the surface per unit area, i.e., sufficient "irradiance", measured in Watts per square metre (W/m2). Thus, the higher the source power, the larger the treated surface area can be. For a femtosecond laser, the selected average power can be in the range of 1 to 1000 micro-Watts (μW) For a continuous-wave (CW) laser, the selected average power can be in the range of from 10 to several hundred milli-Watts (mW), preferably in the range of from 10 to 100 milli-Watts (mW). For a UV lamp or other light source, the selected power output can be in the range of 100 to 1000 Watts, such as for example, a power output of about 100 W. The source can include pulsed sources (including pulsed lasers, and camera flashes) and CW sources (including sunlight, UV lamps, and laser diodes).

In some embodiments, photo-thermal reduction may advantageously permit the controlled removal of oxygen functional groups by adjusting the power of the source of light or radiation. Different powers can be used to generate different temperatures. In turn, as different oxygen containing functional groups may have different binding energies, different oxygen containing functional groups may dissociate at different temperatures, allowing particular oxygen containing functional groups to be selectively removed.

Photo-chemical reduction uses a shaped pulse of light or radiation to control chemical reactions that occur during the reduction of the porous graphene oxide film. Thus light or radiation may facilitate the chemical reduction of one or more oxygen containing functional groups in the graphene oxide film. In some embodiments, it may be possible to control the pore size and/or the interlayer spacing of a porous reduced graphene oxide film by selectively removing certain oxygen containing functional groups that are situated in the pores of graphene oxide sheets and/or in between graphene oxide sheets. The selective removal of an oxygen containing functional group may be facilitated by the use of a shaped pulse of light or radiation.

A shaped pulse, such as a shaped light pulse, may be provided by a suitable source of light or radiation. In some embodiments, a shaped pulse may be provided from a femtosecond laser. Any suitable femtosecond laser can be used. Furthermore, any suitable spot size can be used. The spot size depends on the laser power and the average power of the laser depends on the repetition rate of the laser pulses (for 1 kHz it requires several tens of μW and for 80 MHz it requires several mW).

In some embodiments, the selective reduction of oxygen containing functional groups may be manipulated by changing the pulse shape. In such embodiments, the pulse shape can be iteratively updated by a feedback loop taking input from an in-situ monitoring method, including published techniques to characterise graphene oxide and reduced graphene oxide using Raman spectroscopy or Fourier transform infrared (FTIR) spectroscopy, which is known to a skilled person in the art.

When spacers or crosslinks are present in the porous graphene oxide film, the interlayer spacing of the resultant porous reduced graphene oxide film may be influenced by both the size of the spacers and whether the spacers are removed by the reduction process. For example, organic or polymer-like spacers may be removed by the irradiation, while the nanoparticles or quantum dots spacers may not not be removed.

Irradiation with the beam of light or radiation may provide the ability to accurately control the reduction process and hence the pore size and interlayer spacing in the porous reduced graphene oxide film. For instance, reduction of an oxygen containing functional group in a pore of a graphene oxide sheet and/or in between two or more graphene oxide sheets may be selectively controlled by adjusting the radiation power. In some embodiments, the higher the power of the beam, the higher the proportion of oxygen containing functional groups in the graphene oxide film that are reduced.

The ability to control the reduction process through irradiation of the porous graphene oxide film using a controlled beam enables porous reduced graphene oxide films having different pore sizes and/or interlayer spacing in different regions of the film to be produced. Accordingly, it is possible to tune the properties (for example, one or more of the following: pore/defect size, layer spacing, electrical conductivity, hydrophilicity, surface charge properties, surface roughness, or other mechanical properties) of the porous reduced graphene oxide film to suit a desired application by controlling the power of the beam to adjust the pore size and/or interlayer spacing with high precision in the sub-nanometer region.

Reducing the oxygen containing functional groups in the porous graphene oxide film by irradiation allow the type and coverage of oxygen containing functional groups in the film to be manipulated by adjusting irradiation parameters (including wavelength, power, and exposure time) of the light source. Consequently, the surface properties of the porous graphene oxide films can be selectively controlled to suit different applications.

For example, when light or radiation of short wavelength is used for irradiation, the power can be reduced due to higher photon energy. Furthermore, for a given wavelength and power of light or radiation, an increase in exposure time can increase the number of oxygen containing functional groups being removed and thus increase the extent by which the graphene oxide film is reduced. Additionally, for a shaped light pulse, the repetition rate, pulse width and pulse shape may also influence the extent of reduction.

For a given source of radiation, the operating power range can be ascertained by scanning the power. The lower power threshold (i.e. the reduction threshold) of a beam can be determined by observing a transmission change under an optical microscope. The upper power threshold (i.e. the ablation/burning threshold) of a beam can be ascertained by visually observing when ablation of the GO film occurs, e.g., by using a microscope. The upper and lower thresholds can dictate the operating range of power in which irradiation can be performed. Selective oxygen containing functional group removal can be achieved by controlling the power of the beam within the operating range. For example, changing the pulse widths of the laser can lead to change of the peak power of the femtosecond laser while maintaining the same average power, and the ratio of C—O and C=O bonds can be changed in accordance to the change of the pulse widths, as described in further detail below.

The porous graphene oxide film is irradiated at least once, and may be irradiated multiple times, in order to reduce the oxygen containing functional groups in the film. Multiple irradiations may result in the removal of an increasing number of oxygen containing functional groups in the film.

The irradiation affords the ability to locally reduce oxygen containing functional groups in at least one selected area of the porous graphene oxide film. Thus, it may be possible to form a patterned film comprising selected areas of graphene oxide and reduced graphene oxide for specific applications.

For instance, patterning with an irradiation process can be achieved by laser patterning or photo-illumination, which can be facilitated with a mask. The mask can cover a defined area of a porous graphene oxide film and may help to direct or control how light or radiation reaches that area of the film. This in turn may help to control how oxygen containing functional groups are reduced in that particular area of the film. In this manner, a porous reduced graphene oxide film having different localised areas with different degrees of reduction can be formed. Such a patterned reduced graphene oxide film may be advantageous as it can enable the fabrication of filters having multiple integrated regions with different properties (e.g., pore/defect size, layer spacing, electrical conductivity, hydrophilicity, surface charge properties, surface roughness, or mechanical properties) in the different regions.

The beam may also be able to selectively remove carbon atoms from a graphene-based sheet by selectively breaking carbon-carbon bonds and removing $sp^3$ carbon atoms in the graphene basal plane of the sheet. In this manner, additional pores may be generated in the porous reduced graphene oxide film.

Moreover, the reduction process can be combined with a graphene oxide film synthesis technique that controls the properties of the interlayer space, providing a larger tuning range for the interlayer spacing. Thus the interlayer spacing may be tuned within a distance ranging from tens of nanometres down to sub-nanometres. Accordingly, the process of the embodiments may provide porous reduced graphene oxide films having a range of versatile properties.

Irradiation Using Graphene Oxide (GO) Film

In some embodiments, the method of the embodiments described herein includes irradiation of a GO film with the beam of light or radiation.

Figure 2:
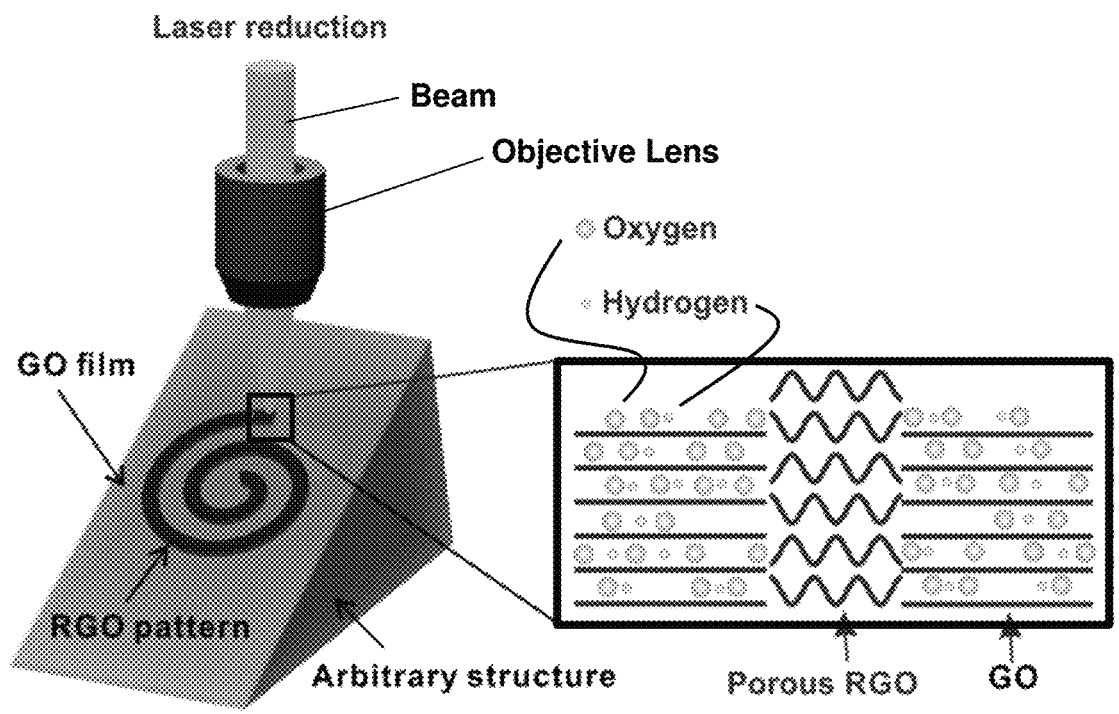
FIG. 2 is a schematic diagram of an apparatus for photo-reduction of graphene oxide film attached to a 3D surface; wherein the inset of FIG. 2 schematically shows generation of conductive porous reduced graphene oxide (RGO)

FIG. 2 illustrates an exemplary process of irradiation of the GO film.

As shown in FIG. 2, the GO film may be attached to a three-dimensional (3D) surface. An emitting device is used as the radiation source, which can be a laser emitting device or laser. For example, the emitting device may be a laser, including a laser diode or a femtosecond laser source. The emitting device may be mounted on a movement control device to form a movable emitting system (which may be referred to as a "laser 3D printer"), in which the 2D and/or 3D position of the emitting device and the beam are controllable and adjustable.

As shown in FIG. 2, a focusing element, which can be an objective lens, may also be used to focus the laser beam on the 3D surface the GO film is attached to. The focusing element may be connected to the emitting device and/or the movement control device, so as it may move together with the emitting device. The objective lens may be conventional objective lens that can be used to focus a beam of light or radiation. The focusing element may also be part of a commercially available emitting device package, e.g., a laser or a light that has a focusing lens. In some other embodiments, the emitted laser may be directly used for the reduction, without using the focusing element, which can be used for large area reduction.

The beam of light or radiation may be movable relative to the GO film during the irradiation, thereby allowing reduction of the GO film according to a selected pattern. The selected pattern may be any suitable 2D or 3D pattern. The movement of the beam may be controlled manually. Alternatively, the movement of the beam may be controlled automatically, e.g., by running a pre-programmed controlling program based on the selected pattern.

The emitting device may include a 3D surface detecting unit that automatically detects the 3D surface, which may allow the GO film to be attached to an arbitrary surface, e.g., surface with an arbitrary 2D/3D shape or structure.

The inset of FIG. 2 is a schematic diagram showing the reduction of the GO film. As shown in FIG. 2, the oxygen functional groups, including oxygen and hydrogen atoms, locate between the GO sheets. Under the irradiation, the oxygen functional groups are removed to form reduced graphene oxide (RGO), conductivity of the graphene layers, and generate pores in the GO film.

Irradiation Using Graphene Oxide (GO) Solution

In some embodiments, the method includes irradiation of a GO solution with the beam of light or radiation.

The reduction process by irradiation may be combined with a GO film synthesis technique that controls the properties of the interlayer space, providing a larger tuning range for the interlayer spacing. Thus the interlayer spacing may be tuned within a distance ranging from tens of nanometres down to sub-nanometres. Accordingly, the process of the embodiments may provide reduced graphene oxide (RGO) films having a range of versatile properties.

The GO solution used in the irradiation process may be prepared using known methods, e.g., oxidisation and subsequent exfoliation, as described above.

Further, for GO solution with cross-linkers, cross-linking may be achieved by the irradiation. Thus, it is possible to simultaneously cross-link and reduce the GO, by using GO solution with cross-linkers, or by adding cross-linkers to GO solution prior to the irradiation.

Figure 3:
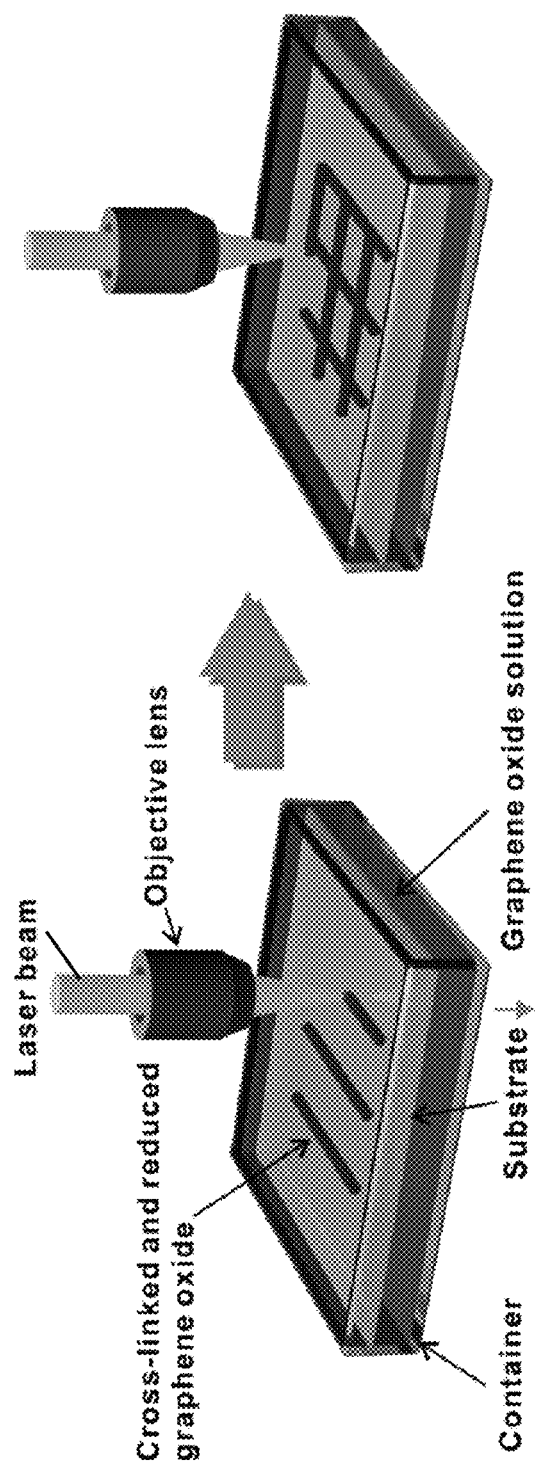
FIG. 3 is a schematic diagram of an apparatus for simultaneously cross-linking and reducing graphene oxide from graphene oxide solution.

FIG. 3 shows an exemplary process of simultaneously photo-crosslinking and reducing the GO from its solution.

As shown in FIG. 3, the GO solution with cross-linkers is stored in a container. The substrate to which the structure can attach is submerged in the GO solution. An emitting device is used as the radiation source. For example, the emitting device may be a laser diode or a femtosecond laser source. The emitting device may be mounted on a movement control device to form a movable emitting system (which may be referred to as a "laser 3D printer"), in which the 2D and/or 3D position of the emitting device is controllable and adjustable.

A beam is emitted by the emitting device, and focused by a focusing element to a point on or close to the surface of the GO solution. The cross-linking and photo reduction occurs at the centre of the irradiated spot on the surface of the GO solution. The focusing element may be connected to the emitting device and/or the movement control device, so as it may move together with the emitting device. The objective lens may be conventional objective lens that can be used to focus a beam of light or radiation. The objective lens may also be part of a commercially available emitting device package, e.g., with a laser emitting device.

The beam of radiation may be movable relative to the substrate during the irradiation, thereby allowing fabrication of the RGO according to a selected pattern. The selected pattern may be any suitable 2D or 3D pattern, thereby allowing fabrication of a RGO of a desired structure. The movement of the beam may be controlled manually. Alternatively, the movement of the beam may be controlled automatically, e.g., by running a pre-programmed controlling program based on the pattern.

After the cross-linking and reduction process, the fabricated sample may be washing by water, so that the GO flakes that are cross-linked and reduced may remain on the sample, while the ones not cross-linked may be washed away.

In this way, it is possible to combine the film synthesis, reduction and device fabrication into a single step, which may boost the efficiency of the fabrication process of the RGO structure.

Further, as the cross-linking and reduction occurs around the surface of the GO solution, the RGO structure may be fabricated in a layer-by-layer manner, by moving the substrate down (e.g., towards the bottom of the container). The linewidth of the generated structure may be controlled by selecting the numerical aperture of the focusing element, and/or controlling the laser power, as shown in FIG. 19.

Controlling the Conductivity and Pore Size

The conductivity and the pore size of the RGO material may be controlled by selecting or controlling the irradiation parameters.

By the irradiation, the oxygen functional groups may be removed and hydrophobic graphene domains may be formed. In this process, gases, such as $CO$, $CO_2$ and $H_2O$ vapour, may be generated due to the removal of oxygen functional groups and the water between the plurality of layers of GO sheets. During the irradiation, the gases may be heated up in a high speed, which may result in expansion of the volume of the gases, thus generating pores between layers.

FIG. 4A shows an exemplary relationship between the pore sizes and the laser power. FIG. 4B shows an exemplary relationship between the pore sizes and the scanning speed. FIG. 4C shows an exemplary relationship between the resistivity and the laser power.

As shown in FIG. 4A-FIG. 4C, it is possible to continuously tune, with high precision, the pore size and the conductivity of the RGO structure, in selected sub-micron region via the control of laser power and scanning speed.

Supercapacitor with RGO Electrodes

The RGO structure generated according to the above-described method may be used for a range of applications, including making electrodes of a capacitor.

The RGO structure generated according to the above-described method may be used for making electrodes of a supercapacitor.

The supercapacitor including electrodes made of the RGO structures prepared using the above-described method (which may be referred to below as "the RGO supercapacitor") may have any one of the following structures: a sandwich structure, an interdigital structure, and a 3D structure.

Alternatively, the RGO supercapacitor may have any suitable structure other than the sandwich structure, the interdigital structure, and the 3D structure.

Supercapacitor with a Sandwich Structure

In some embodiments, the RGO supercapacitor may have a sandwich structure.

Figure 5A:
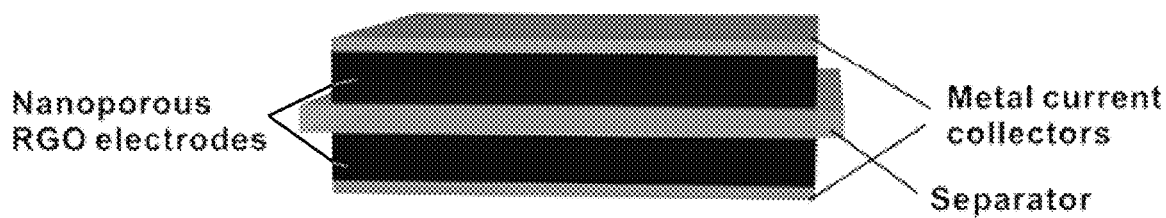
FIG. 5A and FIG. 5B are schematic diagrams of two types of a sandwich structure of a RGO supercapacitor.
Figure 5B:
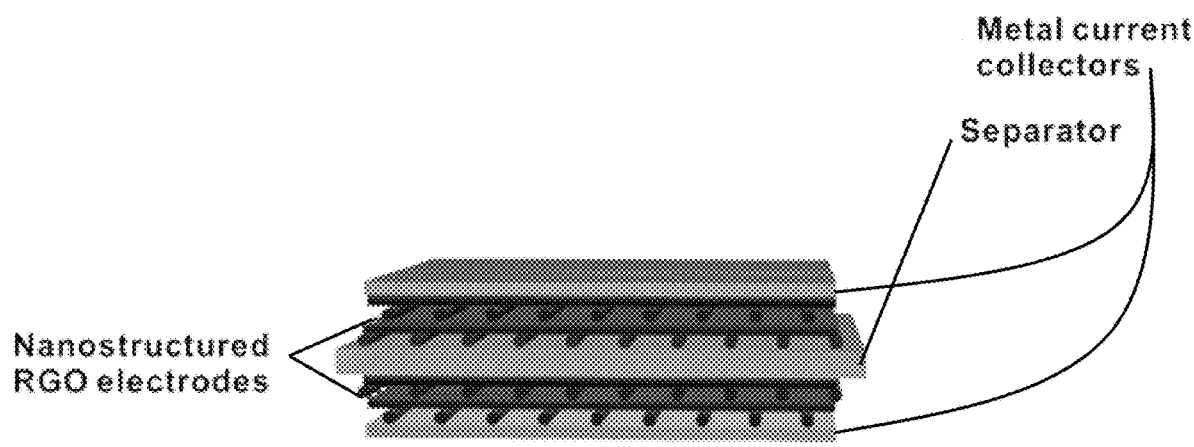

FIG. 5A and FIG. 5B illustrate two types of sandwich structure of the RGO supercapacitor. Each of the sandwich structures shown in FIG. 5A and FIG. 5B includes two electrodes, a separator sandwiched between the two electrodes, and a pair of current collectors connected to the electrodes.

In the RGO supercapacitor shown in FIG. 5A, the RGO electrodes with pores are sandwiched between two metal current collectors, which are separated by a separator (e.g., a dielectric separator). The RGO electrodes may be fabricated using the irradiation process as described above, and may include nanopores generated during the photo-reduction process.

The RGO electrodes may be nanostructured, as shown in FIG. 5B (which may be referred to as "nanostructured sandwich design"), by fabrication using the simultaneous cross-linking and photo-reduction process. In the nanostructured electrodes, the pore size and layer spacing may be selectively controlled by controlling the cross-linking and photo-reduction process.

The process of making RGO supercapacitors with sandwich structures may include the following steps:

(1) fabricating the RGO structure, which will be used as the electrodes of the supercapacitor; and
(2) assembling the electrodes with metal current collectors and separators.

The process of making RGO supercapacitors may further include any additional steps of making capacitors known to a skilled person. For example, the electrodes, the separator and the collectors may be attached layer-by-layer (as shown in FIG. 5A), which may then be filled in a plastic package. Next, the electrolyte is added into the package. Finally, the package is sealed, for example by using a vacuum sealer. Therefore, the electrodes, the separator and the collectors are held in place by the sealed package, and the pressure from the sealed package may facilitate the attachment of the elements.

The separator and the collectors may be made in any conventional methods known to a skilled person. The collectors may be metals, for example, any one or more of the following: Al, Pt, Au, Ag, Cu, or steel. The separator may be made using materials including nonwoven fibers (e.g., cotton, nylon, polyesters, and glass), and polymer films (e.g., polyethylene, polypropylene, poly such as tetrafluoroethylene, and polyvinyl chloride). In some embodiments, the separator may be made of the graphene oxide film made according to the methods described above.

In some other embodiments, the RGO supercapacitor may have any suitable sandwich structure other than the ones shown in FIG. 5A and FIG. 5B.

The sandwich supercapacitor may be made in any suitable shape and size, for example, in a cuboid shape with the height of 80 μm, the width of 1 cm, and the length of 1 cm.

Supercapacitor with an Interdigital Structure

In some embodiments, the RGO supercapacitor may have an interdigital structure.

Figure 6A:
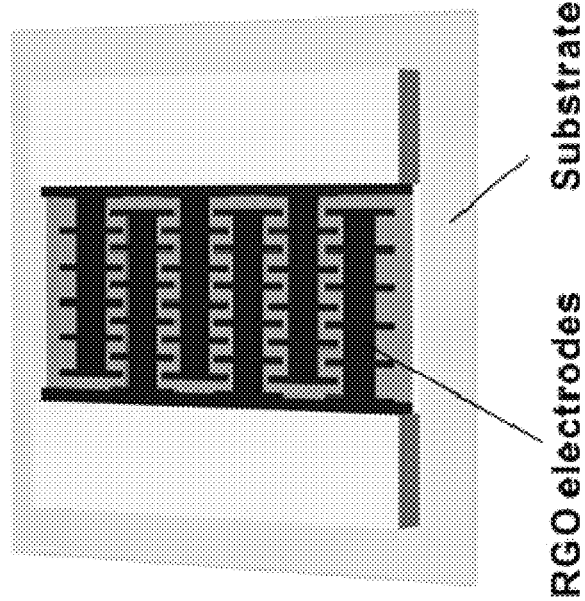
FIG. 6A and FIG. 6B are schematic diagrams of two types of RGO supercapacitor with interdigital structures.
Figure 6B:
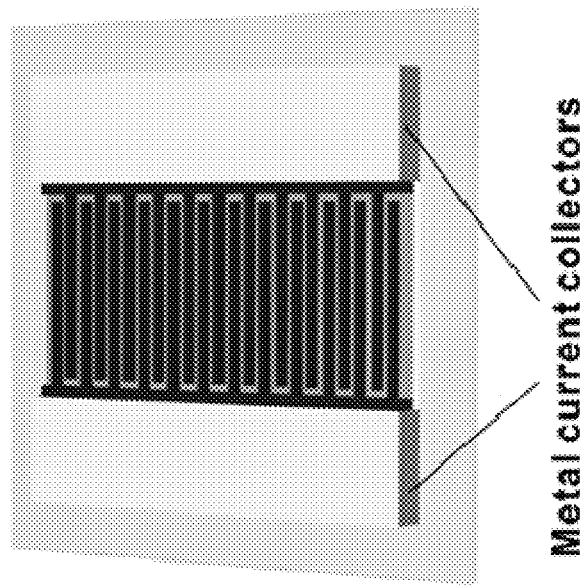

FIG. 6A and FIG. 6B show two types of RGO supercapacitor with interdigital structure, and both may be fabricated by the photo-reduction process described above, using different design patterns.

In an interdigital supercapacitor design, the anode and cathode intersect in one plane, which is parallel to the plane of graphene oxide layers. Therefore, the ions travel within the plane. In this way, the mean ionic path is shortened.

In the interdigital structures shown in FIG. 6A and FIG. 6B, the graphene oxide film without reduction is used as the separator of a supercapacitor. The supercapacitor further includes a pair of current collectors connected to the electrodes. In this way, the interdigital design does not require adding a separator. As a result, the volume ratio of the electrode material may be higher than the sandwich design, which may improve the energy density and power density of the supercapacitor.

In addition, as the interdigital supercapacitor design requires only a layer of graphene oxide material (the sandwich requires two layers of reduced graphene oxide, and a layer of separator), the thickness of the supercapacitor may be reduced. Moreover, it may be easy to stack the interdigital supercapacitors along the direction normal to the plane to further use the 3D space. Last but not least, the interdigital structure can be on-chip integrated with other electronic devices.

Compared to the sandwich structures, the interdigital structures may provide shorter mean ionic paths, and may be easier to be integrated with on-chip devices. Further, the interdigital structures may allow more efficient use of the 3D volume of the device, i.e., storing more energy within a limited volume.

Compared to the interdigital structure shown in FIG. 6A, the interdigital structure shown in FIG. 6B (which may be referred to as a "fractal interdigital design") allows more efficient use of the area of the device, thus may enhance the overall energy density of the supercapacitor, i.e., storing more energy within a limited volume.

As shown in FIG. 6B, a fractal interdigital design bears a pattern that each part of which has the same or similar geometrical character as the whole.

Electrodes having a fractal interdigital supercapacitor design may further increase the capacitance of the interdigital supercapacitor by adopting patterns in which the fractal curves enclose a modest area with a long boundary, as the increase in the capacitance is in proportion to the increase in the boundary length due to lateral fringing. In the meantime, the fractal pattern is able to fill more electrode material within the same area. In this way, the volume ratio the electrode material is increased, which is beneficial for storing more charges to enhance the energy density. Further, the fractal pattern minimize the distance between electrodes, which shortens the mean ionic path and enhance the power density.

The process of making RGO supercapacitors with interdigital structures may include the following steps:
(1) attaching or depositing the metal current collectors onto the graphene oxide film; and
(2) forming the RGO electrodes by photo reduction process.

As previously described, for RGO supercapacitors with interdigital structures, no separator is needed. In assembly, the collectors may be attached to the patterned electrodes. The electrodes with the collectors may then be put in a plastic package, into which electrolyte can be filled. After adding electrolyte, the package may be sealed by a vacuum sealer.

The current collectors may be made of metals, for example, any one or more of the following: Al, Pt, Au, Ag, Cu, or steel. The electrodes and the collectors may be connected by using any suitable means, for example by using conductive tape/glue or applying pressure using clip.

For making RGO supercapacitors with interdigital structures, these two steps may be performed in any selected order, according to the device design and applications.

Figure 8A:
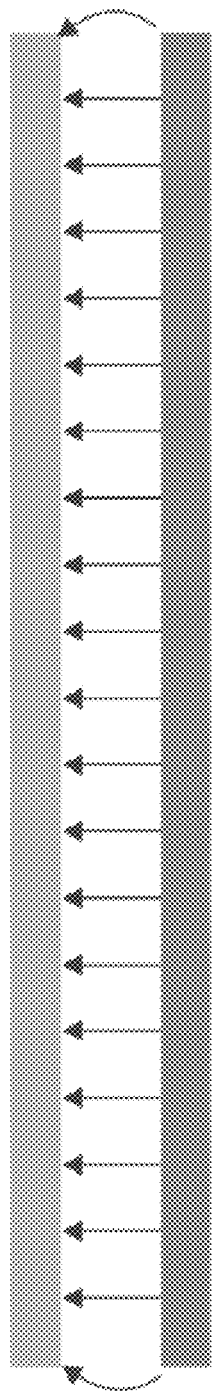
FIG. 8A, FIG. 8B, and FIG. 8C are schematic diagrams showing an increase in lateral flux of a capacitor using fractal electrodes.
Figure 8B:
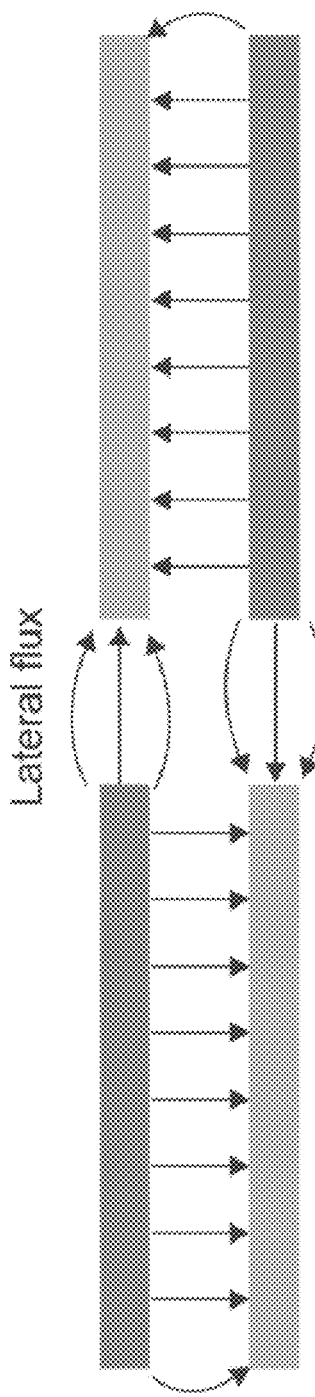
Figure 8C:
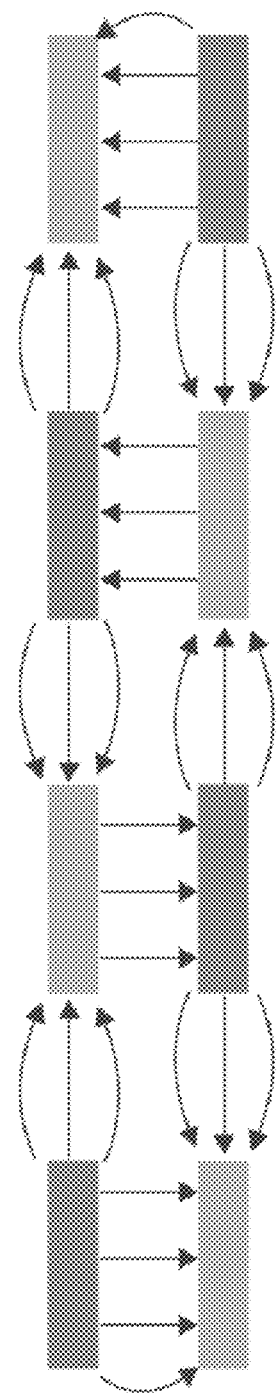

Further, due to the capability of drawing arbitrary patterns using the 3D laser printing technique, when making supercapacitors with the interdigital structure as shown in FIG. 6B, it is possible to increase the capacitance of the supercapacitor by adopting patterns in which the fractal curves enclose a modest area with a long boundary, as the increase in the capacitance is in proportion to the increase in the boundary length due to lateral fringing, as shown in FIGS. 8B and 8C. The meaning of "lateral fringing" is known to a skilled person in the art, as described for example in Samavati, H., et al. (1998). "Fractal capacitors." IEEE Journal of solid-state circuits 33(12): 2035-2041

In some other embodiments, the RGO supercapacitor may have any suitable interdigital structure other than the ones shown in FIG. 6A and FIG. 6B.

The RGO supercapacitors with an interdigital structure may have any suitable shape and size, for example, a cuboid shape with the height of 25 μm, the width of 5 mm, and the length of 1.5 cm.

Supercapacitor with a 3D Structure

In some embodiments, the RGO supercapacitor may have a 3D structure.

Compared to the sandwich structure and the interdigital structure, the 3D structure may allow more efficient use of the 3D volume of the device, i.e., storing more energy within a limited volume.

Figures 7A, 7B:
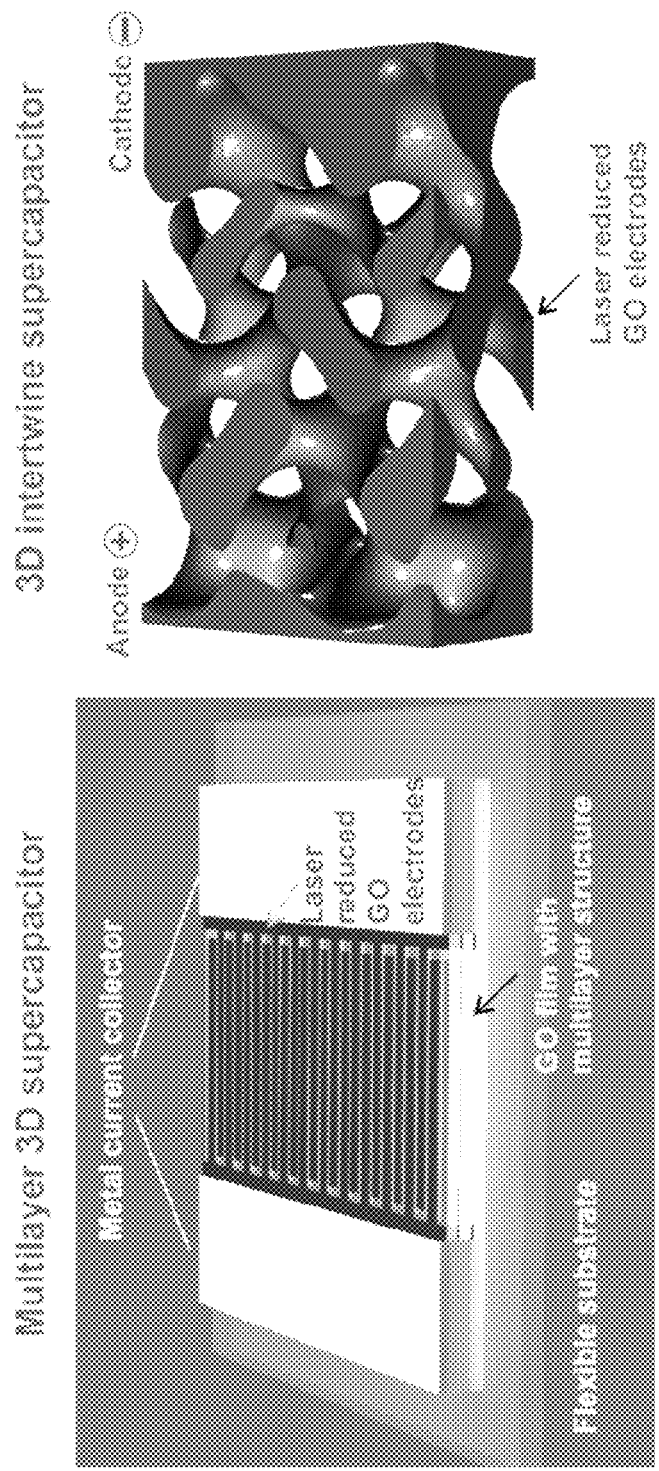
FIG. 7A and FIG. 7B are schematic diagrams of two types of RGO supercapacitor with a 3D structure.

The 3D structure may include one of: a 3D multilayer structure, and a 3D intertwined structure. FIG. 7A shows an example of a 3D multilayer structure. FIG. 7B shows an example of a 3D intertwined structure.

In some embodiments, the 3D multilayer structure as shown in FIG. 7A may be made using multiple layers of graphene oxide film which are separated by insulating dielectric material that is transparent, e.g. polymer such as the same polymer for self-assembly as previously mentioned, or photo-polymer, which can be polymerized upon light irradiation. By this arrangement, the irradiation in the photo-reduction process may simultaneous reduce and fabricate the multilayer graphene oxide structure, which may allow the supercapacitor to be fabricated in one go.

The 3D intertwined structure shown in FIG. 7B may be made by 3D fabrication using the method described above, e.g., the simultaneously cross-linking and photo-reduction process.

As shown in FIG. 7B, the two electrodes are intertwined three-dimensionally with each other, the thickness of the solid lines and the distance between the two electrodes are kept constant. The ions are attached to the surface of the two electrodes. Electrolyte in a gel form is injected between the electrodes, which is able to provide positive and negative ions and act as the separator. The overall surface area for ion attachment is controlled by the thickness of the solid lines and the distance between the two electrodes. The thinner the thickness the larger the surface area and the smaller the distance the larger the surface area.

3D fabrication of the 3D intertwined structure may allow minimizing of the mean ionic path by intertwining the nanostructured anode and cathode. In this way, the ions may be stored in the nanopores between electrodes. As a result, the ions may only have to travel nanometre distances during the charge and discharge processes.

In the 3D multilayer structure shown in FIG. 7A, the graphene oxide film without reduction is used as the separator of the supercapacitor. In the 3D intertwined structures shown in FIG. 7B, the separator of the supercapacitor may be electrolyte in gel form.

The supercapacitors in both FIG. 7A and FIG. 7B further include a pair of current collectors connected to the electrodes.

In some other embodiments, the RGO supercapacitor may have any suitable 3D structure other than the ones shown in FIG. 7A and FIG. 7B.

The RGO supercapacitors with a 3D multilayer structure may have any suitable shape and size, for example, a cuboid shape with the height of 5 μm, the width of 5 mm, and the length of 1.5 cm.

The RGO supercapacitors with a 3D intertwined structure may have any suitable shape and size, for example, a cubic shape with the length being any value between 100 μm and 1 mm.

The current collectors for supercapacitors having the 3D multilayer structure or the 3D intertwined structure may be made of metals, for example, any one or more of the following: Al, Pt, Au, Ag, Cu, or steel.

For the 3D multilayer structure, the electrodes and the collectors may be connected by: first etching through the side the electrodes by high power laser, and then depositing the collectors, which connects to the electrodes in each layer.

For the 3D intertwined structure, the electrodes and the collectors may be connected by: connecting the collectors to the two sides (anode and cathode, left and right in the FIG. 7B) of the whole structure of the electrodes.

Supercapacitor with a Fractal Pattern

Fractals are infinitely complex patterns that are self-similar across different scales. They are created by repeating a simple process over and over in an ongoing feedback loop. The number of loops decides the scale of the largest pattern and smallest pattern.

In some other embodiments, the electrodes of the RGO supercapacitor may have a fractal pattern. FIG. 6B shows one example of the fractal pattern. The fractal pattern may have other suitable shapes different from the one shown in FIG. 6B.

Fractals are infinitely complex patterns that are self-similar across different scales. The fractal pattern may be a 2D fractal pattern, or a 3D fractal pattern.

As shown in FIG. 8A, FIG. 8B and FIG. 8C, the fractal pattern may enhance lateral flux of the capacitor, thus increasing the total amount of capacitance. Further, the fractal design may increase the capacitance per unit area as the distance between the electrodes scales down. In this way, supercapacitors with electrodes in fractal patterns may exploit both lateral and vertical electric fields to increase the capacitance per unit area. Further, fractal structures may maximize periphery, which increases field usage, and may minimize internal resistance while maximizing surface-to-volume ratios.

As previously described, the capacitance of the supercapacitor can be increased by increasing the overall surface area and the lateral fringing. The increase is proportional to the length of the boundary of the electrodes. As fractal curves enclose a modest area with a very long boundary, having fractal patterns may allow the supercapacitor to provide increased capacitance.

FIG. 6B shows a supercapacitor with a 2D fractal interdigital structure.

Further, the supercapacitor with electrodes including a fractal pattern is not limited to interdigital structures. Rather, the fractal structure may be applied to supercapacitors of other types, such as the supercapacitor with the sandwich structures, or the supercapacitor with the 3D structures.

Exemplary Processing Method

Figure 9:
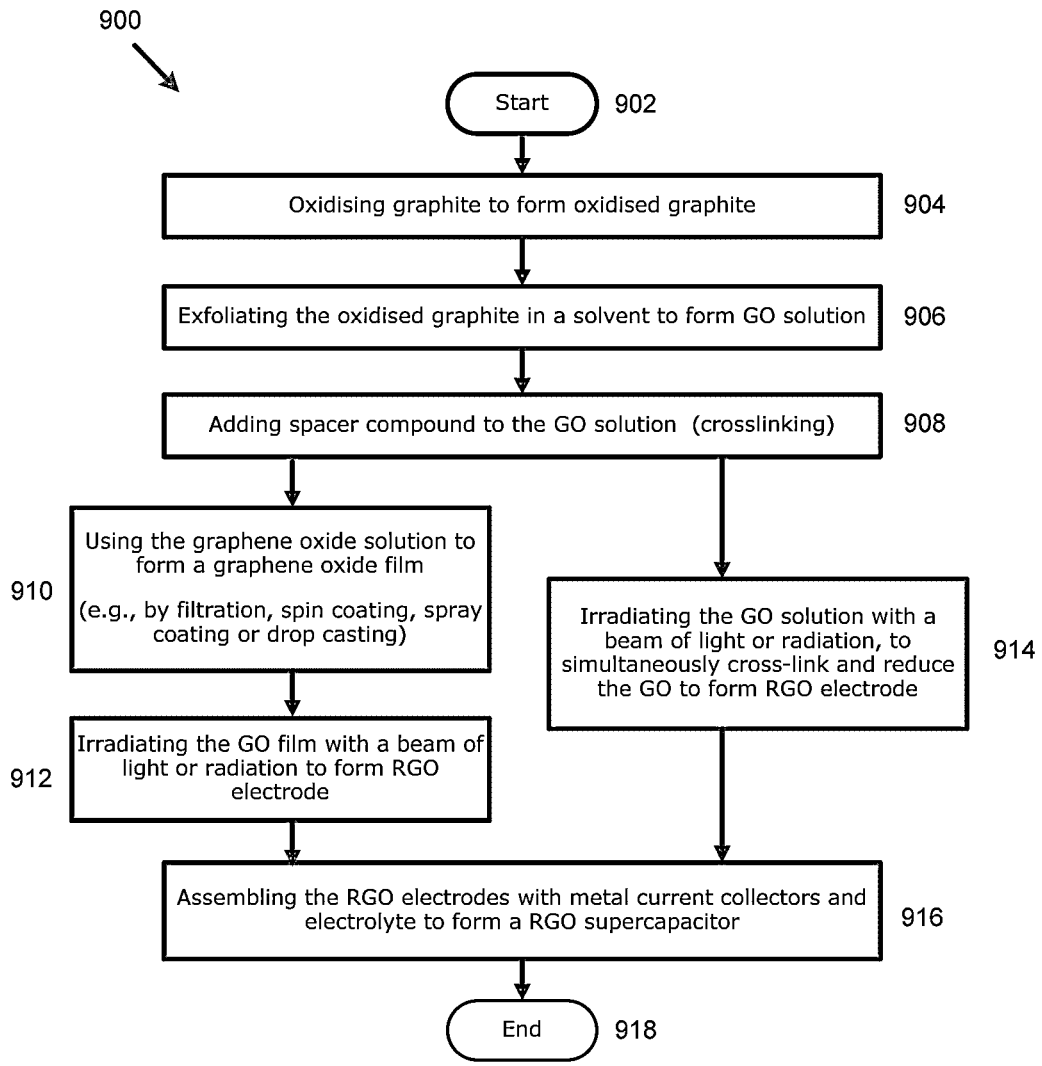
FIG. 9 is a flow chart of a described method for forming RGO.

As shown in FIG. 9, a method 900 of forming RGO according to some embodiments commences at step 902.

At step 904, graphite is oxidised to generate graphite oxide. The generated graphite oxide is then exfoliated at step 906 to form GO solution. At step 908, spacer compound is added to the GO solution for crosslinking of GO.

The GO solution formed at step 908 may then be used to form a GO film at step 910. At step 912, the GO film is irradiated with a beam of light or radiation to form a RGO structure that will be used as electrode(s) in a RGO supercapacitor.

Alternatively, GO solution formed at step 908 may be irradiated with a beam of light or radiation at step 914, to simultaneously cross-link and reduce the GO, thereby forming a RGO structure that will be used as electrode(s) in a RGO supercapacitor.

At step 916, the formed RGO structure is assembled with metal current collectors, and electrolyte is added to form a RGO supercapacitor.

EXAMPLE APPLICATIONS

The reduced graphene oxide (RGO) structure, the RGO electrodes or the RGO supercapacitor made according to the methods as described above, may provide a number of advantages or technical effects. The energy density may be similar to that of lithium batteries. The graphene oxide solution may be synthesised directly from bulk graphite material with oxidants, and the graphene oxide films may be manufactured with economical synthesis techniques such as vacuum filtration, self-assembly, spray coating and drop casting. Only nanometre to microns thickness is needed without reinforcement using other materials, so only a small amount of GO material may be necessary for manufacturing a large number of supercapacitors. The reduction of the graphene oxide material may be performed using inexpensive laser diodes. The thin film structure may be flexible to attach to any structures and surfaces. The film synthesis techniques may allow the attachment of graphene oxide films to any 3D structures or surfaces, thus saving space for storing graphene oxide supercapacitors. With the laser 3D printing reduction techniques, it is possible to achieve film coating and fabrication of supercapacitors in one step, without further transferring processes. This may allow easy integration of the graphene oxide supercapacitor with other electronic devices, e.g., solar panels. The thin film structure may be stitched to cloths, bags or shoes for powering personal electronic devices. The RGO supercapacitors may be integrated with helmets, e.g., bike helmets, to power built-in head lights (e.g., white light LEDs with high brightness). By using the high resolution laser 3D printer, the size of the RGO electrodes may be reduced down to nanometre scales, which allows the fabrication of supercapacitors with footprints of several microns that can be easily integrated with microelectronic chips. The flexibility of the laser 3D printer fabrication system may allow design and fabrication of RGO supercapacitors with selected parameters, such as selected footprint, capacitance, voltage and/or current. Further, it is possible to vary the geometric shape from device to device by simply changing the design pattern. Using the simultaneous cross-linking and reduction of graphene oxide, it is possible to further save raw materials, as there is no need to further make a separator, and only the material for making the electrodes are required. This may further reduce the weight of the supercapacitors. The ultrahigh power density may provide high current for electronic devices, while charging the RGO supercapacitors may be completed within a very short time period. The RGO supercapacitors may be thermally stable and chemically inert, which allows application in demanding environments. The RGO films may have high tolerance to high temperatures, oxidants, strong acidic/alkaline regents, or organic solvents. The RGO films may have a high mechanical strength. With high mechanical strength, thermal and chemical stability, the lifetime of the RGO supercapacitor can be significantly longer than existing supercapacitors.

The RGO structure, the RGO electrodes and the RGO supercapacitors may be prepared in an environmentally friendly manner, employing environmentally friendly solvents. Furthermore, the RGO films may be non-toxic and compatible with biological samples.

The methods for preparing the RGO structure for making the electrodes, as described above, may provide a number of advantages or technical effects. As the 3D laser printing technique is able to fabricate 3D nanostructures layer-by-layer, it may be possible to design novel sandwich supercapacitors with nanostructured electrodes with precisely-controlled pore sizes. Due to the capability of drawing arbitrary patterns using the 3D laser printing technique, when making supercapacitors with fractal interdigital structures, it may be possible to utilise the lateral fringing to further increase the capacitance of the supercapacitor. By controlling the focal depth of the irradiation beam, it may be possible to simultaneously reduce multilayers of graphene oxide film to make 3D supercapacitors. The flexibility of the 3D laser printing allows fabrication of intertwined 3D supercapacitors, in which the surface area is maximized and the mean ionic path is well-defined and minimized. Thus it may be possible to achieve high energy density and power density. The high spatial resolution and precision of 3D laser printing, down to nanometer scale, may allow the fabrication of supercapacitors with overall size in micron scale that can be integrated with on-chip electronic circuits. The 3D laser printing technique may allow photo reduction of the graphene oxide film attached to an arbitrary 3D surface, thus it may be possible to spray-coat the graphene oxide film on the surface of any object, then one-step fabricate the supercapacitors without requiring any film transferring process.

The supercapacitors made using the method as described above may be used for suitable applications, which may include one or more of the following: a solar battery (e.g., by integrating the supercapacitor with a solar panel); a power supply for unmanned aerial vehicle (UAV); a power supply for electrical bikes or vehicles; a night-vision-goggles power source; a power supply for military radio; a power supply for military GPS devices; a power supply for solar powered road illumination; a power supply for solar powered irrigation system; a power supply for mobile houses; in biomedical applications, e.g., power supply for bio-implants; a power supply for consumer electronics, e.g., cell phone batteries; a power supply for light-rails and trams; a smart and microgrid; a biosensor; a chargeable coat for powering personal devices; a chargeable bag for powering personal devices; a chargeable bike helmet with built-in head lights; and a power supply for green houses or other horticulture-related applications.

The supercapacitors made using the method as described above may be characterized by known electrochemical techniques, e.g., any one or more of the following techniques: cyclic voltammetry, cyclic charge discharge, leakage current measurement, self-discharge measurement, and electrochemical impedance spectroscopy.

The embodiments will now be described with reference to the following examples. However, it is to be understood that the examples are provided by way of illustration of the embodiments and that they are in no way limiting to the scope of the invention.

EXAMPLES

Described below are exemplary experiments involved a process of making RGO structures and RGO supercapacitors, and the corresponding experimental results.

Preparation of Graphene Oxide Solution

The natural graphite powder (SP-1, Bay Carbon) (20 g) was put into an 80° C. solution of concentrated $H_2SO_4$ (30 mL), $K_2S_2O_8$ (10 g), and $P_2O_5$ (10 g). The resultant dark blue mixture was thermally isolated and allowed to cool to room temperature over a period of 6 hours. The mixture was then carefully diluted with distilled water, filtered, and washed on the filter until the rinse water pH became neutral. The product was dried in air at ambient temperature overnight. This peroxidised graphite was then subjected to oxidation by Hummers' method. The oxidised graphite powder (20 g) was put into cold (0° C.) concentrated $H_2SO_4$ (460 mL). $KMnO_4$ (60 g) was added gradually with stirring and cooling, so that the temperature of the mixture was not allowed to reach 20° C. The mixture was then stirred at 35°

C. for 2 hours, and distilled water (920 mL) was added. In 15 min, the reaction was terminated by the addition of a large amount of distilled water (2.8 L) and 30% $H_2O_2$ solution (50 mL), after which the colour of the mixture changed to bright yellow. The mixture was filtered and washed with 1:10 HCl solution (5 L) in order to remove metal ions. The graphite oxide product was suspended in distilled water to give a viscous, brown, 2% dispersion, which was subjected to dialysis to completely remove metal ions and acids. As-synthesized graphite oxide was suspended in water to give a brown dispersion, which was subjected to dialysis to completely remove residual salts and acids. Ultrapure Milli-Q water was used in all experiments. As-purified graphite oxide suspensions were then dispersed in water to create a 0.05 wt % dispersion. Exfoliation of graphite oxide to GO was achieved by ultrasonication of the dispersion using a Brandson Digital Sonifier (S450D, 500 W, 30% amplitude) for 30 min. The obtained brown dispersion was then subjected to 30 min of centrifugation at 3,000 r.p.m. to remove any unexfoliated graphite oxide (usually present in a very small amount) using an Eppendorf 5702 centrifuge with a rotor radius of 14 cm.

Preparation of Porous Graphene Oxide Films:

The graphene oxide solution was used to prepare porous graphene oxide (GO) films via three different film synthesis techniques. The prepared GO films were then subjected to a reduction process by irradiation with a laser diode or femtosecond laser to produce a reduced graphene oxide (RGO) film.

Example 1: Formation of Porous GO Film Formed by Filtration and Reduction of the GO Film by Laser Diode The graphene oxide solution prepared above (the total weight of graphene oxide used is 1 mg) was used to made graphene oxide film by using filtration method (Sigma-Aldrich® vacuum filtration assembly, for 47 mm filter) through an Anodisc membrane filter (47 mm in diameter, 0.2 mm pore size; Whatman). A fully dried porous GO film was achieved in approximately 5 hours at ambient conditions.

A laser diode (650 nm, 200 mW) mounted on a homemade 3D printer frame (Prusa i3) was used to prepare a reduced graphene oxide (RGO) film. The prepared graphene oxide film was reduced by using the laser diode working at 30 mW power focused by a 10×, 0.25 NA objective with a scanning speed of 2 mm/s. The pattern was designed using Inscape or Coreldraw, then converted to Python codes by a homemade program.

Irradiation by laser diode produced a porous reduced graphene oxide (RGO) film. If desired, multiple writing processes were performed to further reduce the graphene oxide film.

Example 2: Formation of Porous GO Film Formed by Filtration and Reduction of the GO Film by Femtosecond Laser Following the procedure described in Example 1, a porous GO film was formed by filtration.

A femtosecond laser (Coherent Libra, 800 nm, 10 kHz repetition rate, 3 W output power) working at 10 μW power focused by a high numerical aperture objective (100×0.85 NA) was used to prepare a reduced graphene oxide (RGO) film. The prepared graphene oxide film was mounted on a 3D nanoscanning stage (Physik Instrumente P-517) and scanned at 10 μm/s. The scanning stage was driven by a homemade Labview program. The pattern was designed as bitmap and converted to a txt file by a homemade Matlab program.

Irradiation by femtosecond laser produced a porous reduced graphene oxide (RGO) film.

Example 3: Formation of Porous GO Film Formed by Self-Assembly and Reduction of the GO Film by Laser Diode A glass slide substrate was sonicated in acetone, methanol and Milli-Q water for 5 minutes to fully clean the surface. The following steps were then performed: (1) the substrate was submerged in a 2% poly(diallyldimethylammonium chloride) (PDDA) water solution for 1 minute and then taken out; (2) the PDDA-modified substrates was cleaned by soaking in Milli-Q water to remove excess PDDA at the surface and completely dried by compressed air, (3) the dried substrate was submerged in 5 mg/ml graphene oxide solution for 1 minute and then take out, (4) the graphene-oxide modified substrate was soaked in Milli-Q water and dried by compressed air. Steps (1) to (4) were repeated for N times to get N self-assembled layers. In this way, a self-assembled porous graphene oxide film was made.

The self-assembled GO film was reduced by using the laser diode according to the procedure described in Example 1 to form a porous reduced graphene oxide (RGO) film.

Example 4: Formation of Porous GO Film Formed by Self-Assembly and Reduction of the GO Film by Femtosecond Laser Following the procedure described in Example 3, a porous GO film was formed by self-assembly.

The GO film was then subjected to a reduction by femtosecond laser following the procedure described in Example 2 to form a porous reduced graphene oxide (RGO) film.

Example 5: Formation of Porous GO Film Formed by Drop Casting and Reduction of the GO Film by Laser Diode A glass slide substrate was sonicated in acetone, methanol and Milli-Q water for 5 minutes to fully clean the surface. A 5 mg/ml graphene oxide solution was dropped onto the surface of the substrate to cover the whole surface. The resulting sample was dried in fume hood for 8 hours in room temperature to produce a porous graphene oxide (GO) film.

The prepared GO film was reduced by using the laser diode according to the procedure described in Example 1 to form a porous reduced graphene oxide (RGO) film.

Example 6: Formation of Porous GO Film Formed by Drop Casting and Reduction of the GO Film by Femtosecond Laser Following the procedure described in Example 5, a porous GO film was formed by drop casting.

The GO film was then subjected to a reduction by femtosecond laser following the procedure described in Example 2 to form a porous reduced graphene oxide (RGO) film.

Results

Porous reduced graphene oxide films prepared in the above examples were analysed by Raman spectroscopy and X-ray photo-electron spectroscopy (XPS). Some results are discussed below.

Laser Diode Reduction of Porous GO Films Prepared by Filtration Method (Raman and XPS)

Figure 10A:
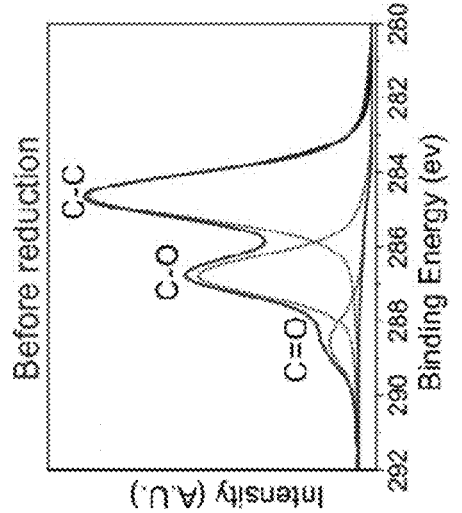
FIG. 10A, FIG. 10B, and FIG. 10C are graphs of XPS spectra of the graphene oxide before reduction (FIG. 10A), and photo reduced once (FIG. 10B) and twice (FIG. 10C)
Figure 10B:
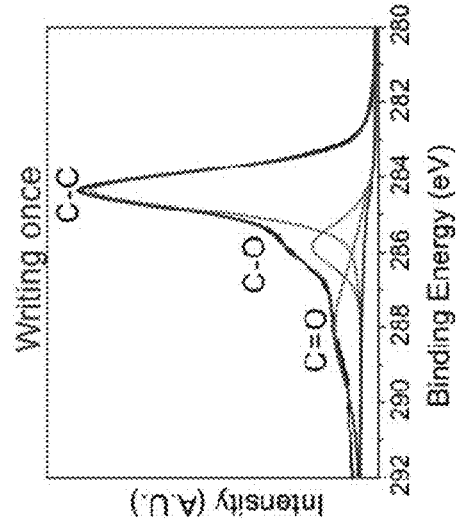
Figure 10C:
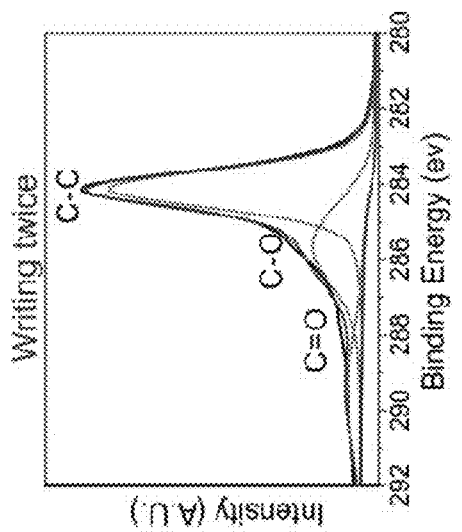

The X-ray photo-electron spectroscopic (XPS) results of the porous GO film produced in accordance with Example 1 and reduced by laser diode (wavelength=785 nm, power=18 mW) is shown in FIG. 10A, FIG. 10B and FIG. 10C. As one can see in FIG. 10A, FIG. 10B and FIG. 10C, the strength of the C—O bond peak is significantly reduced by the resulted C:O ratio and the percentage of the C—C bonds (including $sp^2$ and $sp^3$ bonding). After irradiation by writing the GO film with laser diode twice, the reduction results slightly improved.

Figures 11A, 11B, 11C:
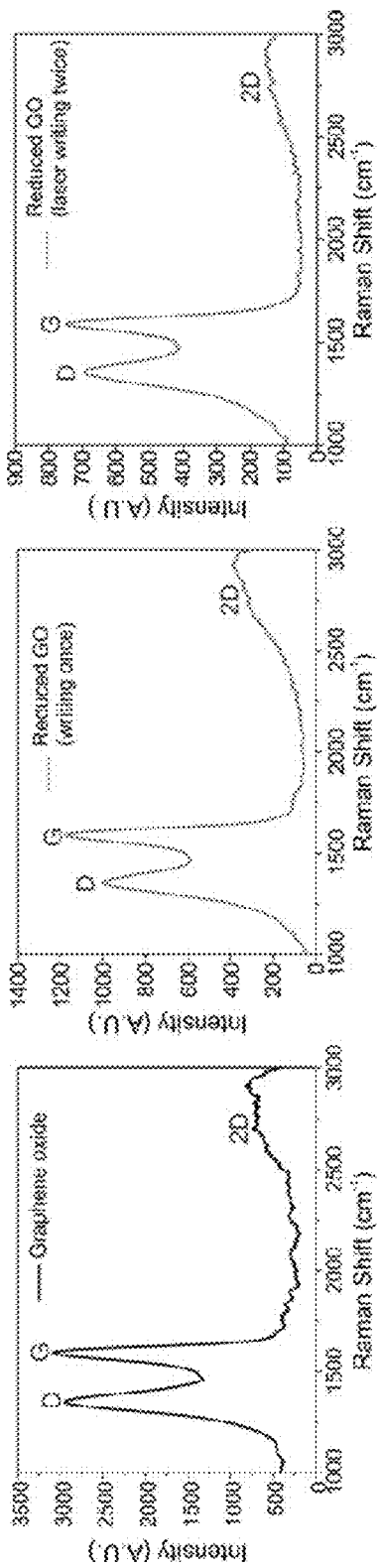
FIG. 11A, FIG. 11B, and FIG. 11C are graphs of Raman spectra of a graphene oxide film prepared using a filtration technique (FIG. 11A), and photo reduced once (FIG. 11B) and twice (FIG. 11C)

The Raman spectrum of the GO film produced by filtration technique is shown in FIG. 11A. The spectra of a porous reduced graphene oxide (RGO) film produced by irradiation with laser diode (LD) either once and twice is shown in FIGS. 11B and 11C, respectively. The LD reduction significantly decreased the $I_D/I_G$ ratio, which corresponds to lower defect density. After second reduction, the $I_D/I_G$ ratio is increased slightly.

Femtosecond Laser Reduction of Porous GO Films Prepared by the Self-Assembly Method (Raman Spectra)

Figure 12A:
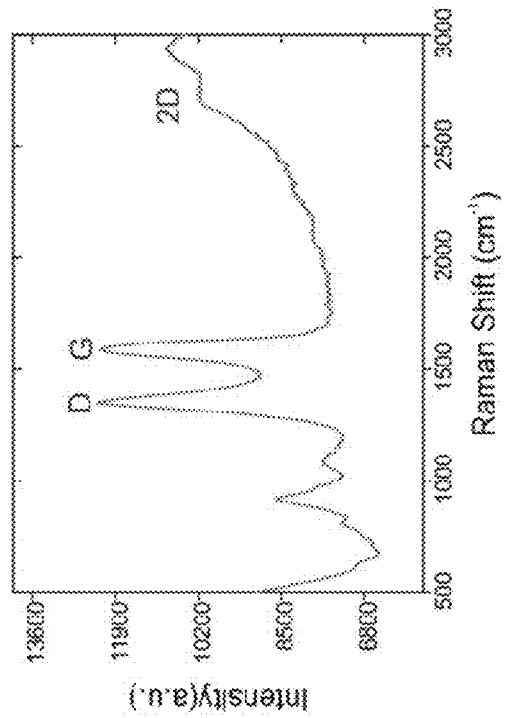
FIG. 12A and FIG. 12B are graphs of a Raman spectra of graphene oxide film prepared using a self-assembly method (FIG. 12A), and reduced by a femtosecond laser (FIG. 12B)

The Raman spectrum of the porous GO film produced in accordance with Example 4 is shown in FIG. 12A. The GO film reduced by femtosecond laser (wavelength=800 nm, repetition numerical simulation rate=10 kHz, pulse width=85 fs) is shown in FIG. 12B.

Figure 12B:
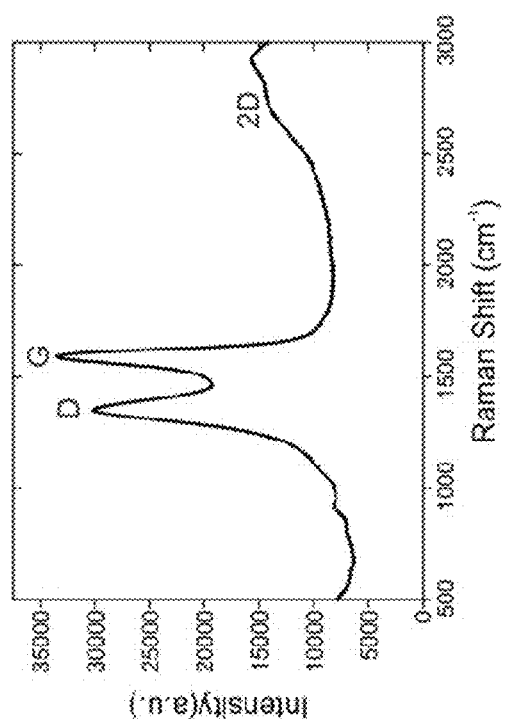
Figure 13A:
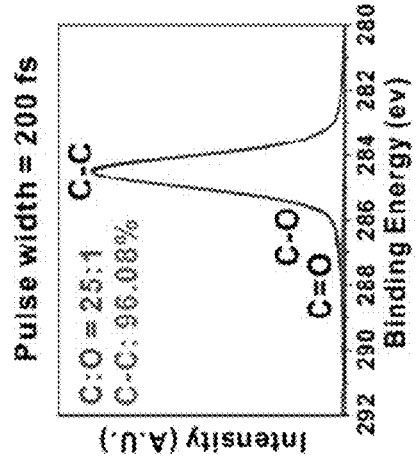
FIG. 13A, FIG. 13B, FIG. 13C, FIG. 13D, and FIG. 13E are graphs of XPS spectra of a drop-casted GO film reduced by the femtosecond laser, with different pulse widths.
Figure 13B:
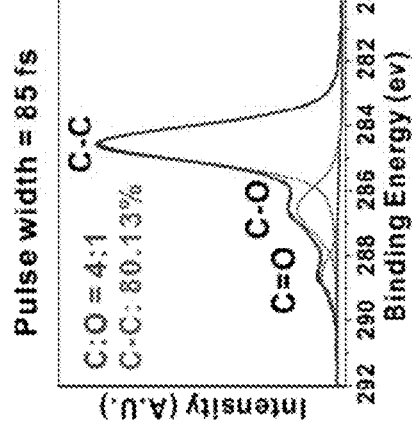
Figure 13C:
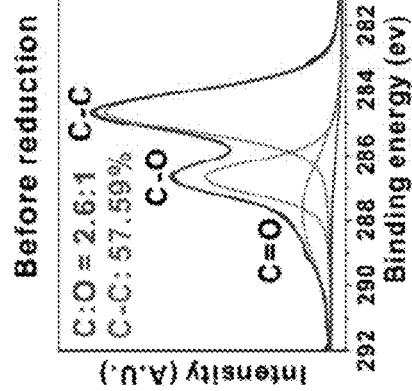
Figure 13D:
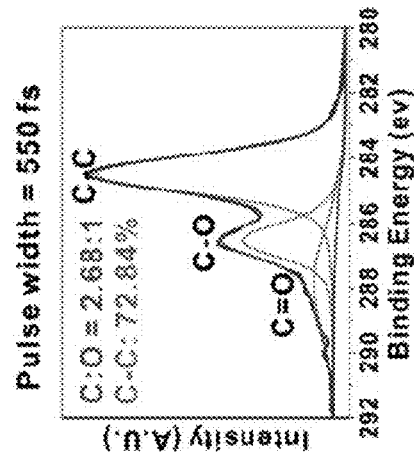
Figure 13E:
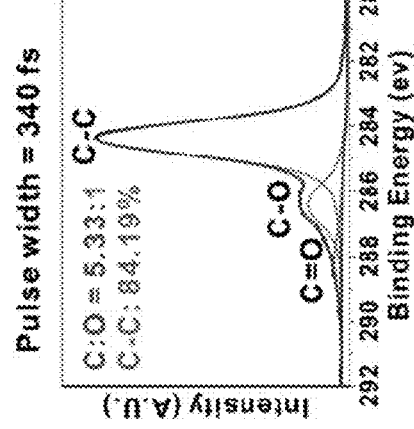

As seen in FIG. 12B, the $I_D/I_G$ ratio increased slightly after laser reduction, however, one can see significantly increase of the $I_{2D}/I_G$ ratio which confirms the formation of $sp^2$ graphene domains.

Femtosecond Laser Reduction of Porous GO Films Prepared by the Drop-Casting Method (Raman and XPS)

The X-ray photo-electron spectroscopic (XPS) results of the drop-casted film produced in accordance with Example 6 and reduced by femtosecond laser (wavelength=800 nm, repetition rate=10 kHz) with different pulse width is shown in FIG. 13A, FIG. 13B, FIG. 13C, FIG. 13D and FIG. 13E. As one can see in FIG. 13A, FIG. 13B, FIG. 13C, FIG. 13D and FIG. 13E, the resultant C:O ratio and the percentage of the C—C bonds (including $sp^2$ and $sp^3$ bonding) are affected by the pulse width. The ratio of C—O and C═O bonds are different when the pulse widths are tuned (larger pulse width corresponds to a lower peak power, given the same average power of the femtosecond laser). The C—O bond corresponds to the C—O—C(epoxy) and C—OH (hydroxyl) functional groups and the C═O bond corresponds to >C═O carbonyl and —COOH carboxyl functional groups. This shows that selective reduction of different oxygen functional groups has been achieved.

Figures 14A, 14B:
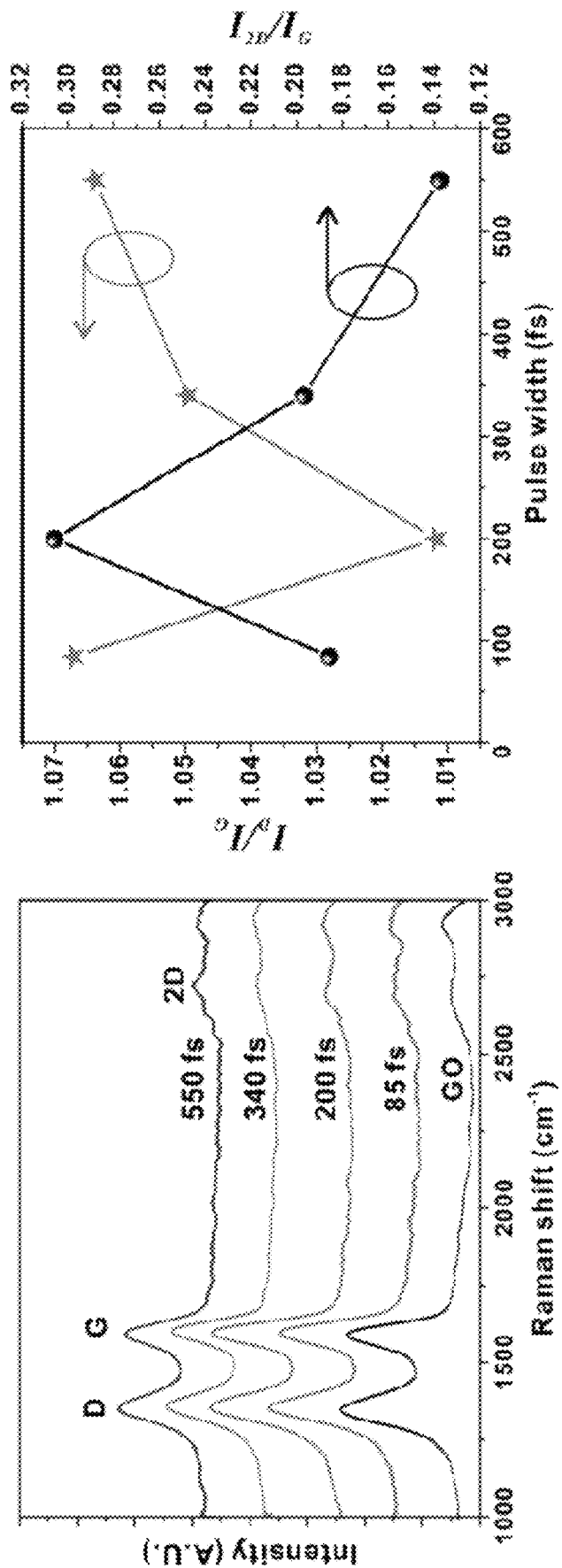
FIG. 14A is a graph of corresponding Raman spectra of the drop-casted film reduced by the femtosecond laser with the different pulse widths.
FIG. 14B is a graph of a $I_D:I_G$ ratio showing defect density, and an $I_{2D}:I_G$ ratio showing formation of $sp^2$ graphene domains of the drop-casted film reduced by femtosecond laser.

The corresponding Raman spectra are shown in FIG. 14A. The $I_D:I_G$ ratio showing the defect density and the $I_{2D}:I_G$ ratio showing the formation of $sp^2$ graphene domain are shown in FIG. 14B.

Example 7: Fabrication and Characterization of Interdigital Supercapacitors

A fabrication process of an interdigital graphene oxide supercapacitor is shown in FIGS. 15A-15D. The fabrication process includes 4 steps: (FIG. 15A) synthesising a graphene oxide film via filtration method and peeling the graphene oxide film off the filter; (FIG. 15B) attaching the graphene oxide film to a flexible substrate; (FIG. 15C) depositing gold current collectors on the graphene oxide film; and (FIG. 15D) fabricating reduced graphene oxide supercapacitors by photo reduction.

Figure 16:
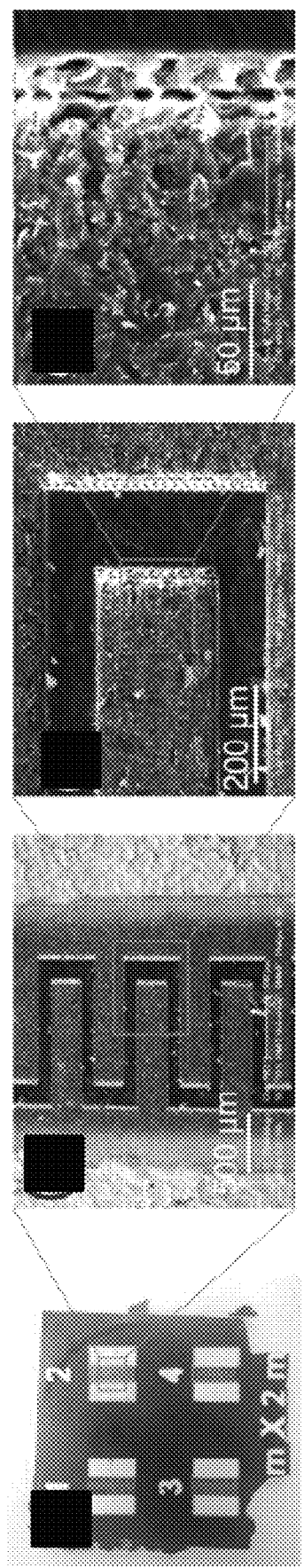
FIG. 16 is an optical photo of the fabricated supercapacitors, with insets that are scanning electron microscopic images of one of the supercapacitors with different magnification rates.

FIG. 16 is an optical photo of the fabricated supercapacitors, with insets showing scanning electron microscopic images of one of the supercapacitors with different magnification rates. As shown in FIG. 16, four supercapacitors with different widths of electrode patterns were made. The scanning electron microscopic images of these supercapacitors are shown in the insets of FIG. 16. In the insets of FIG. 16, the bright areas show the gold current collectors which have high conductivity; the grey areas and the dark areas show the reduced graphene oxide and the graphene oxide respectively, the reduced graphene oxide having higher conductivity than the graphene oxide. As shown in the second inset of FIG. 16 (with the 200 μm scale bar), the surface of the reduced graphene oxide is higher than the graphene oxide, due to the micro pores generated during the photo-reduction process. The details of the micro pores are shown in the highest magnification inset of FIG. 16.

Figure 17A:
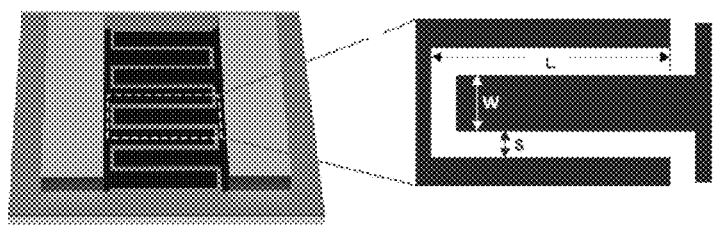
FIG. 17A is a 3D schematic of the RGO supercapacitor with a schematic inset.
Figure 17B:
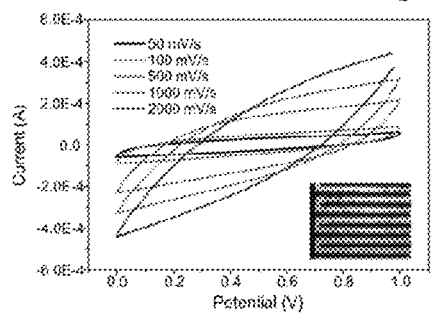
Figure 17F:
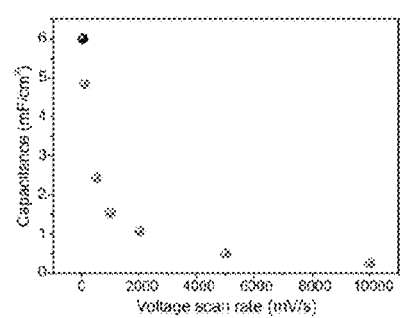
Figure 17C:
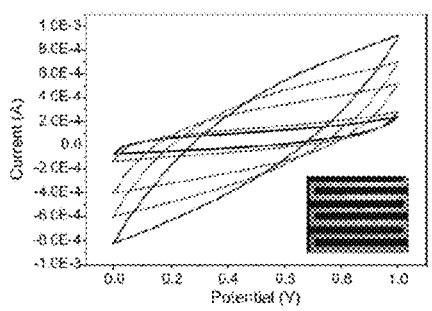
Figure 17G:
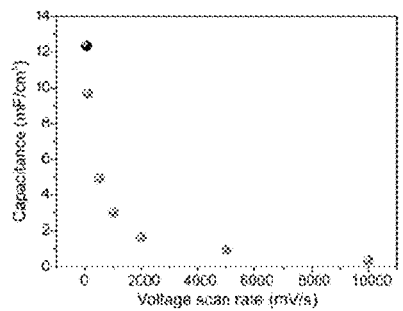
Figure 17D:
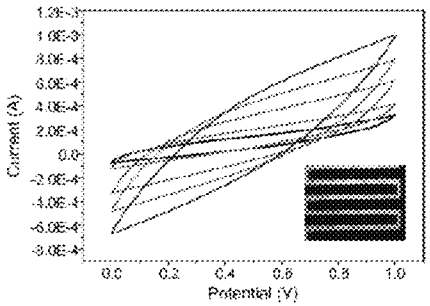
Figure 17H:
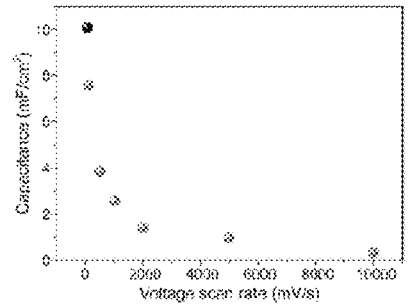
Figure 17E:
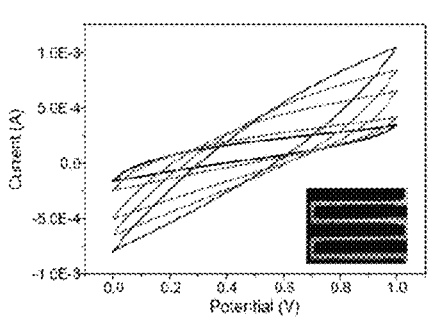
Figure 17I:
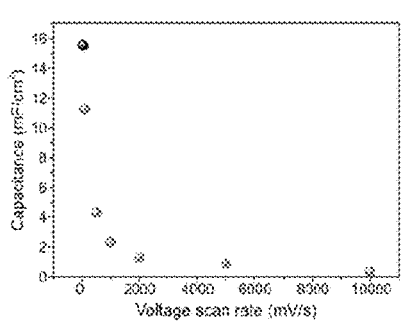

The performances of the fabricated supercapacitors were measured using an electrochemical stat (Metro Autolab N series potentiostat/galvanostat instrument). The electrolyte used was 1 mol/L $H_2SO_4$, and the voltage window was 0 to 1 V. The design pattern of the tested supercapacitors is shown in FIG. 17A, and the definitions of the parameters are shown in the schematic inset of FIG. 17A, where L represents the length of the reduced graphene oxide unit in the electrodes, w represents the width of the reduced graphene oxide unit in the electrodes, and s represents the interspace between the reduced graphene oxide units in the electrodes. In the experiment, the values of L and s were fixed, while w had varied values in different supercapacitors, in order to test the relationship between the value of w and the performance of the supercapacitors. The value of w was selected to increase from 50 μm to 200 μm, with the step being 50 μm. The resulting cyclic voltammetry curves with different voltage scan rates are shown in FIGS. 17B-17E. The corresponding measured specific capacitances are shown in FIGS. 17F-17I.

FIG. 18A and FIG. 18B show a comparison of the performance of the supercapacitors with different width w. As shown in FIGS. 18A and 18B, the specific capacitance changes as the width w changes, which leads to the change of the energy density of the supercapacitor.

FIG. 19 shows a comparison of the linewidth of the generated RGO structure with different laser power. As shown in FIG. 19, as the laser power changes (increases) the linewidth of the generated RGO structure changes (increases nonlinearly). The numerical aperture of the focusing lens used in this example is 1.4.

Example 8: Fabrication and Characterization of Fractal Supercapacitors

A design diagram of a fractal supercapacitor with Hilbert fractal pattern is shown in FIG. 20A, in which the gap is 300 μm, and the area is 5×5 $mm^2$. FIG. 20B shows a fabricated fractal supercapacitor according to the design of FIG. 20A.

FIG. 21 illustrates two fractal supercapacitors with Hilbert fractal pattern of third and fourth iteration, respectively, the pitch interval being 100 μm. FIG. 21 also shows measured performances of the two fractal supercapacitors respectively, including: the resulting cyclic voltammetry curves with different voltage scan rates; and the corresponding measured specific capacitances.

Interpretation and Definition

As used herein, the singular forms "a," "an," and "the" designate both the singular and the plural, unless expressly stated to designate the singular only.

The term "about" and the use of ranges in general, whether or not qualified by the term about, means that the number comprehended is not limited to the exact number set forth herein, and is intended to refer to ranges substantially within the quoted range while not departing from the scope of the invention. As used herein, "about" will be understood by persons of ordinary skill in the art and will vary to some extent on the context in which it is used. If there are uses of the term which are not clear to persons of ordinary skill in the art given the context in which it is used, "about" will mean up to plus or minus 10% of the particular term.

Percentages (%) referred to herein are based on weight percent (w/w or w/v) unless otherwise indicated.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Many modifications will be apparent to those skilled in the art without departing from the scope of the present invention.

The invention claimed is:

1. A method of forming cross-linked reduced graphene oxide including:
   irradiating graphene oxide (GO) in a graphene oxide solution containing cross-linker with a beam of light or radiation produced by a femtosecond laser, wherein the irradiation cross-links and reduces the GO to form crosslinked reduced graphene oxide (RGO), wherein the cross-linker is a spacer compound which is a polyol and wherein the cross-linked RGO is cross-linked by cross-links comprising a spacer derived from the spacer compound.

2. The method according to claim 1, further including:
   focusing the beam of light or radiation to a point on or approximate to the surface of the GO solution.

3. The method according to claim 1, further including:
   adding the cross-linker to the GO solution before irradiating the GO.

4. The method according to claim 1, further including:
   oxidising graphite to form oxidised graphite; and exfoliating the oxidised graphite in a solvent to form the GO solution.

5. The method according to claim 1, further including:
   submerging a substrate in the GO solution to receive the cross-linked RGO.

6. The method according to claim 1, further including:
   providing a substrate in the graphene oxide solution to receive the cross-linked RGO; and
   moving the substrate down relative to the surface of the graphene oxide solution to fabricate a 3D pattern of reduced graphene oxide.

7. The method according to claim 1, including moving the GO relative to the beam in a pattern to form an anode and a cathode that are intertwined.

8. The method according to claim 1, further comprising forming the cross-linked reduced graphene oxide into an electrode.

9. The method according to claim 1, comprising:
   receiving the cross-linked RGO on a substrate submerged in the graphene oxide solution; and
   moving the beam relative to the substrate to fabricate the cross-linked RGO in a selected pattern on the substrate.

10. The method according to claim 5, including moving the beam of light or radiation relative to the substrate to form a two-dimension (2D) pattern of the cross-linked RGO on the substrate.

11. The method according to claim 1, wherein the spacer compound comprises functional groups capable of covalently reacting with oxygen-containing functional groups present on the GO.

12. The method according to claim 11, wherein the functional groups are selected from the group consisting of hydroxy, amino, amido and thiol, and mixtures thereof.

13. The method according to claim 1, wherein the spacer is covalently attached to the RGO.

14. A method of forming cross-linked reduced graphene oxide including:
   irradiating graphene oxide (GO) in a graphene oxide solution containing cross-linker with a beam of light or radiation produced by a femtosecond laser, wherein the irradiation cross-links and reduces the GO to form crosslinked reduced graphene oxide (RGO), wherein the cross-linker is a spacer compound and wherein the cross-linked RGO is cross-linked by cross-links comprising a spacer derived from the spacer compound, wherein the spacer is a polymeric spacer.

15. The method according to claim 14, further including:
   submerging a substrate in the GO solution to receive the cross-linked RGO.

16. The method according to claim 14, further including:
   providing a substrate in the graphene oxide solution to receive the cross-linked RGO; and
   moving the substrate down relative to the surface of the graphene oxide solution to fabricate a 3D pattern of reduced graphene oxide.

17. The method according to claim 14, including moving the GO relative to the beam in a pattern to form an anode and a cathode that are intertwined.

18. The method according to claim 14, comprising:
   receiving the cross-linked RGO on a substrate submerged in the graphene oxide solution; and
   moving the beam relative to the substrate to fabricate the cross-linked RGO in a selected pattern on the substrate.

* * * * *